United States Patent
Min et al.

(10) Patent No.: US 11,452,080 B2
(45) Date of Patent: Sep. 20, 2022

(54) PROBES WITH SHORT SERVICE SET IDENTIFIER

(71) Applicant: Intel Corporation, Santa Clara, CA (US)

(72) Inventors: Alexander Min, Portland, OR (US); Laurent Cariou, Portland, OR (US); Shahrnaz Azizi, Cupertino, CA (US); Rath Vannithamby, Portland, OR (US); Carlos Cordeiro, Portland, OR (US); Thomas Kenney, Portland, OR (US); Ravikumar Balakrishnan, Beaverton, OR (US); Javier Perez-Ramirez, North Plains, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/717,629

(22) Filed: Dec. 17, 2019

(65) Prior Publication Data
US 2020/0128531 A1 Apr. 23, 2020

Related U.S. Application Data

(60) Provisional application No. 62/780,476, filed on Dec. 17, 2018, provisional application No. 62/934,016, filed on Nov. 12, 2019.

(51) Int. Cl.
*H04W 72/04* (2009.01)
*H04W 72/12* (2009.01)

(52) U.S. Cl.
CPC ..... *H04W 72/0413* (2013.01); *H04W 72/042* (2013.01); *H04W 72/1284* (2013.01); *H04W 72/1289* (2013.01)

(58) Field of Classification Search
CPC ......... H04W 72/0413; H04W 72/1289; H04W 72/1284; H04W 72/042; H04W 84/12; H04W 48/16
See application file for complete search history.

(56) References Cited

U.S. PATENT DOCUMENTS

| | | | |
|---|---|---|---|
| 2013/0237216 A1* | 9/2013 | Ong | H04W 8/005 455/434 |
| 2014/0112325 A1* | 4/2014 | Calcev | H04W 48/16 370/338 |

(Continued)

OTHER PUBLICATIONS

Derham et al., "Considerations on 6 GHz Discovery", Nov. 12, 2018, IEEE, IEEE 802.11-18/1922r0 (Year: 2018).*

*Primary Examiner* — Michael K Phillips
(74) *Attorney, Agent, or Firm* — Eversheds Sutherland (US) LLP

(57) ABSTRACT

This disclosure describes systems, methods, and devices related to probes with service set identifier (SSID). A device may determine one or more access points (APs) in an enterprise extended service set (ESS). The device may identify a probe request received from a first station device, wherein the probe request comprises a service set element, wherein the service set element comprises a variable number of service set fields based on a number of APs in the ESS. The device may determine that a service set that matches at least one of the service set fields in the service set element. The device may cause to send a probe response to the first station device in response to the probe request.

20 Claims, 19 Drawing Sheets

(56) References Cited

U.S. PATENT DOCUMENTS

| | | | |
|---|---|---|---|
| 2014/0112327 A1* | 4/2014 | Calcev | H04W 48/14 370/338 |
| 2015/0208330 A1* | 7/2015 | Park | H04W 76/10 370/338 |
| 2015/0230093 A1* | 8/2015 | Park | H04W 48/20 726/4 |
| 2015/0282056 A1* | 10/2015 | Cherian | H04W 48/16 370/328 |
| 2015/0382348 A1* | 12/2015 | Hara | H04W 72/0453 370/329 |
| 2017/0215229 A1* | 7/2017 | Lee | H04W 8/005 |
| 2018/0092029 A1* | 3/2018 | Canpolat | H04W 24/02 |
| 2018/0288664 A1* | 10/2018 | Ouzieli | H04W 36/32 |
| 2019/0075469 A1* | 3/2019 | Mahoney | H04W 16/12 |
| 2019/0098565 A1* | 3/2019 | Cherian | H04W 48/18 |
| 2020/0112910 A1* | 4/2020 | Cherian | H04W 48/10 |
| 2020/0336969 A1* | 10/2020 | Gan | H04W 76/11 |
| 2021/0204204 A1* | 7/2021 | Kim | H04W 48/10 |
| 2021/0329547 A1* | 10/2021 | Kim | H04W 52/0216 |

* cited by examiner

PROBES WITH SHORT SERVICE SET IDENTIFIER

CROSS-REFERENCE TO RELATED APPLICATIONS

This application claims the benefit of U.S. Provisional Application No. 62/780,476, filed Dec. 17, 2018, and U.S. Provisional Application No. 62/934,016, filed Nov. 12, 2019, both disclosures of which is incorporated herein by reference as if set forth in full.

TECHNICAL FIELD

This disclosure generally relates to systems and methods for wireless communications and, more particularly, to probes with short service set identifier (SSID).

BACKGROUND

Wireless devices are becoming widely prevalent and are increasingly requesting access to wireless channels. The Institute of Electrical and Electronics Engineers (IEEE) is developing one or more standards that utilize Orthogonal Frequency-Division Multiple Access (OFDMA) in channel allocation.

DETAILED DESCRIPTION

Figure 1:
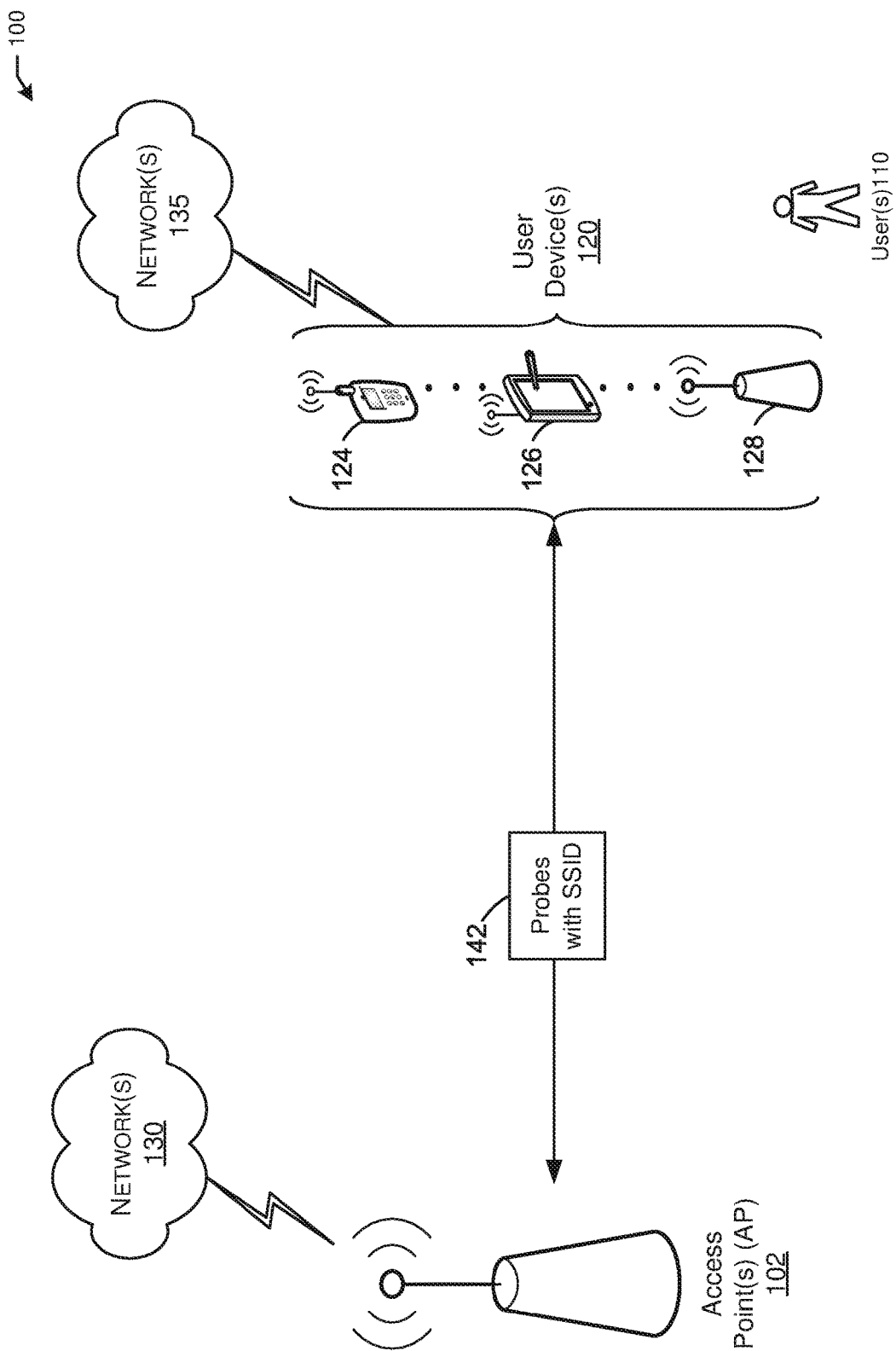
FIG. 1 is a network diagram illustrating an example network environment for probes with service set identifier (SSID), in accordance with one or more example embodiments of the present disclosure.

The following description and the drawings sufficiently illustrate specific embodiments to enable those skilled in the art to practice them. Other embodiments may incorporate structural, logical, electrical, process, algorithm, and other changes. Portions and features of some embodiments may be included in or substituted for, those of other embodiments. Embodiments set forth in the claims encompass all available equivalents of those claims.

A new spectrum at 6 GHz will become available for unlicensed operation in the 2019-2020 timeframe. 802.11ax voted to extend the scope of the project to operate up to 7.125 GHz, in order to enable 802.11ax operation in the 6 GHz band, which spans from 5935 MHz to 7125 MHz.

Most APs will be multi-band devices operating at 2.4/5 and 6 GHz with concurrent operation on each band, which means that each AP on each band will be available and active all the time. It may be mandated that APs operating at 2.4/5 GHz and that are co-located with a 6 GHz AP include a Reduced Neighbor Report in beacons and probe response to describe the co-located AP operating at 6 GHz. This way, the STAs can discover all APs present at 6 GHz by simply scanning the 2.4 and 5 GHz band.

Further, in today's IEEE 802.11 family of standards, the entire DATA field—including the SERVICE field, the PSDU, the TAIL field and the PAD bits—within a physical layer (PHY) protocol data unit (PPDU) is scrambled (descrambled) and encoded (decoded) altogether as a single unit of physical layer (PHY) processing operation.

The current scramble-and-encode-the-entire-Data-as-a-whole approach makes the PHY processing efficient (and streamlined) and minimizes potential processing delay in TX/RX chains. However, such a static PSDU-based scramble-encode approach requires a transmitter (e.g., Wi-Fi AP) to use the same transmission bandwidth (BW) and MCS throughout the entire Data portion of the PPDU (across multiple A-MPDU subframes). An A-MPDU comprises multiple subframes referred to a MPDUs or A-MPDU subframes.

Currently, there is no existing solution to enable blockwise multiple encoding within a PSDU, e.g., per-A-MPDU-subframe scrambling/encoding.

The current PSDU-based scrambling/encoding architecture limits the flexibility in re-configuring transmissions parameters, e.g., transmission BW and MCS, for each A-MPDU subframe on-the-fly. For example, a transmitter (e.g., a Wi-Fi AP) may want to change the transmission BW in the middle of the on-going A-MPDU transmission if it discovers other channels become available for transmission, e.g., (non-)adjacent secondary channels. As another example, the AP may have an immediate feedback channel from the STA (e.g., using full-duplex or by setting up another communication channel on a different band), and in that case, the AP may want to adapt MCS per-MPDU within a PPDU based on the feedback (e.g., Ack) from the STA.

However, current static, per-PSDU scrambling/encoding rule prevents the transmitter from dynamically changing the transmission BW until it completes the transmission of the on-going PPDU. The transmitter cannot change the transmission BW in the middle of on-going PPDU transmission even if it discovers available secondary channels.

Example embodiments of the present disclosure relate to systems, methods, and devices for probes with short service set identifier (SSID).

Currently a probe request frame can include a "SSID List element" that can contain multiple SSID elements of variable length. An AP receiving this probe request and with an SSID matching one of the SSID in the list will respond with a probe response to this probe request.

In one or more embodiments, a probes with SSID system may define a new element called "BSSID List element" that contains a variable number of BSSID fields/elements. An AP receiving a probe request with the BSSID List element included, and that has a BSSID that matches one of the BSSIDs in the list shall send a probe response in response to the probe request.

In one or more embodiments, a probes with SSID system may define a new element called "Short SSID List element" that contains a variable number of Short SSID fields/elements (of 4 Bytes). An AP receiving a probe request with the Short SSID List element included, and that has a Short SSID that matches one of the Short SSIDs in the list shall send a probe response in response to the probe request.

In one or more embodiments, a probes with SSID system may define a new element called "Short SSID element" that contains a single SSID fields (of 4 Bytes). An AP receiving a probe request with the Short SSID element included, and that has a Short SSID that matches the Short SSID element shall send a probe response in response to the probe request.

Example embodiments of the present disclosure relate to systems, methods, and devices for enabling per-A-MPDU-subframe encoding in next generation Wi-Fi.

In one or more embodiments, a A-MPDU subframe encoding system may enable per-A-MPDU-subframe scrambling and encoding in PHY so that the transmitter can dynamically change bandwidth (BW), modulation and coding scheme (MCS) or other transmission configurations even in the middle of the on-going PPDU transmission. This can be done by introducing a series of modifications to the current 802.11 PPDU format, including:

A training field at the beginning of each A-MPDU subframe, used for channel estimation of the larger bandwidth and potentially some signaling (note that this training is a subset of the initial preamble since all other system parameters have been estimated during the on-going transmission), and (Tail) bits (6 currently) at the end of each A-MPDU subframe. Note that this step is required when convolutional encoding is utilized. For the case of LDPC no extra (Tail) bits need to be inserted, and this step can be skipped.

At the beginning of each A-MPDU subframe, the receiver will (i) decode the mid-amble, (ii) prepare the RX chain based on the configuration specified in the expanded training and signaling fields (if needed), and (iii) de-scramble and decode the orthogonal frequency-division multiplexing (OFDM) symbols for the current A-MPDU subframe.

The main advantage of the proposed method is that it allows a transmitter to change (or adjust) the transmission configuration on-the-fly even in the middle of the on-going PPDU transmission, enabling more efficient use of the spectrum. For example, if the transmitter identifies adjacent secondary channel becomes available, then it can start using a wider transmission BW for subsequent A-MPDU subframe transmissions because the transmitter (receiver) encodes (decodes) each A-MPDU subframe separately.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 is a network diagram illustrating an example network environment of probes with SSID, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 14:
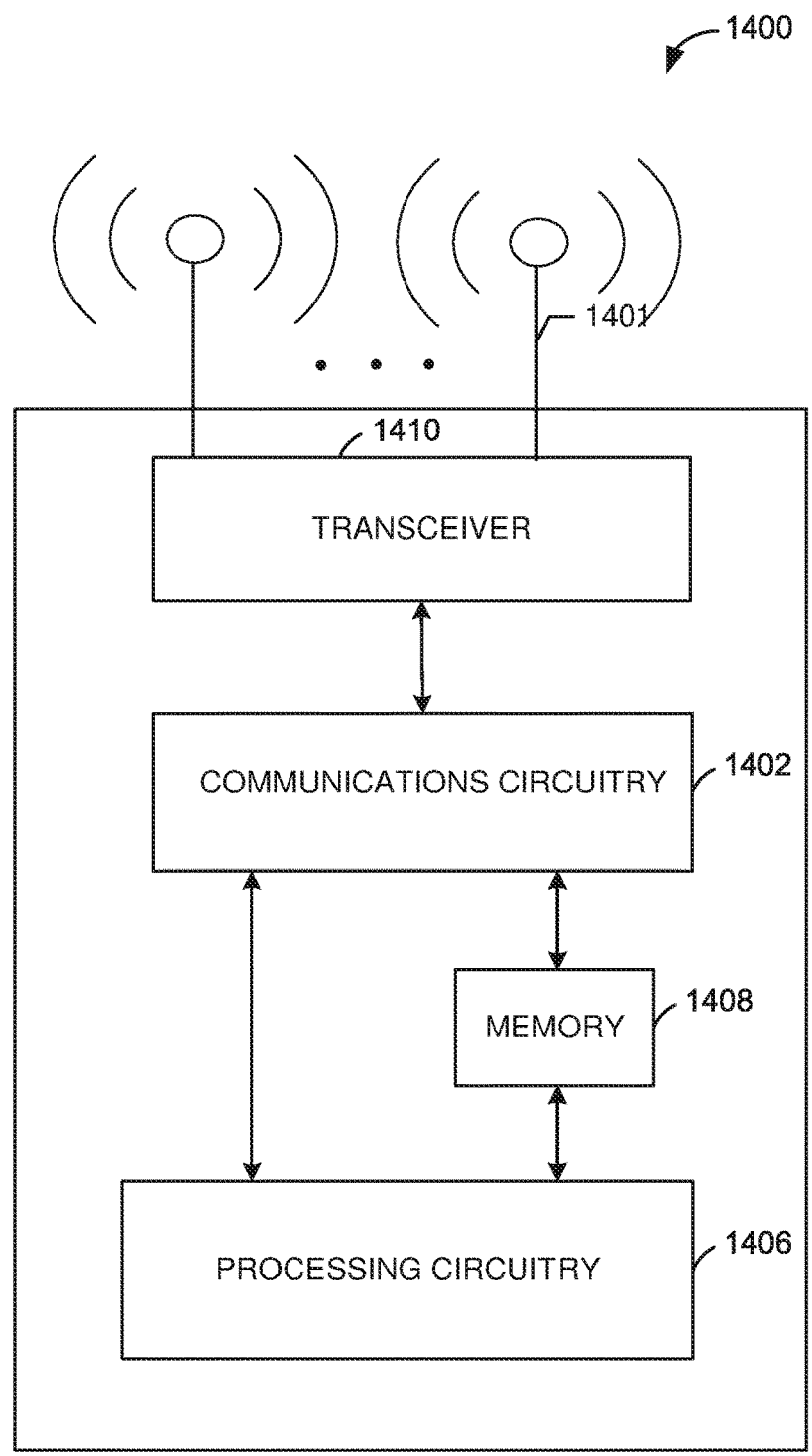
FIG. 14 illustrates a functional diagram of an exemplary communication station that may be suitable for use as a user device, in accordance with one or more example embodiments of the present disclosure.
Figure 15:
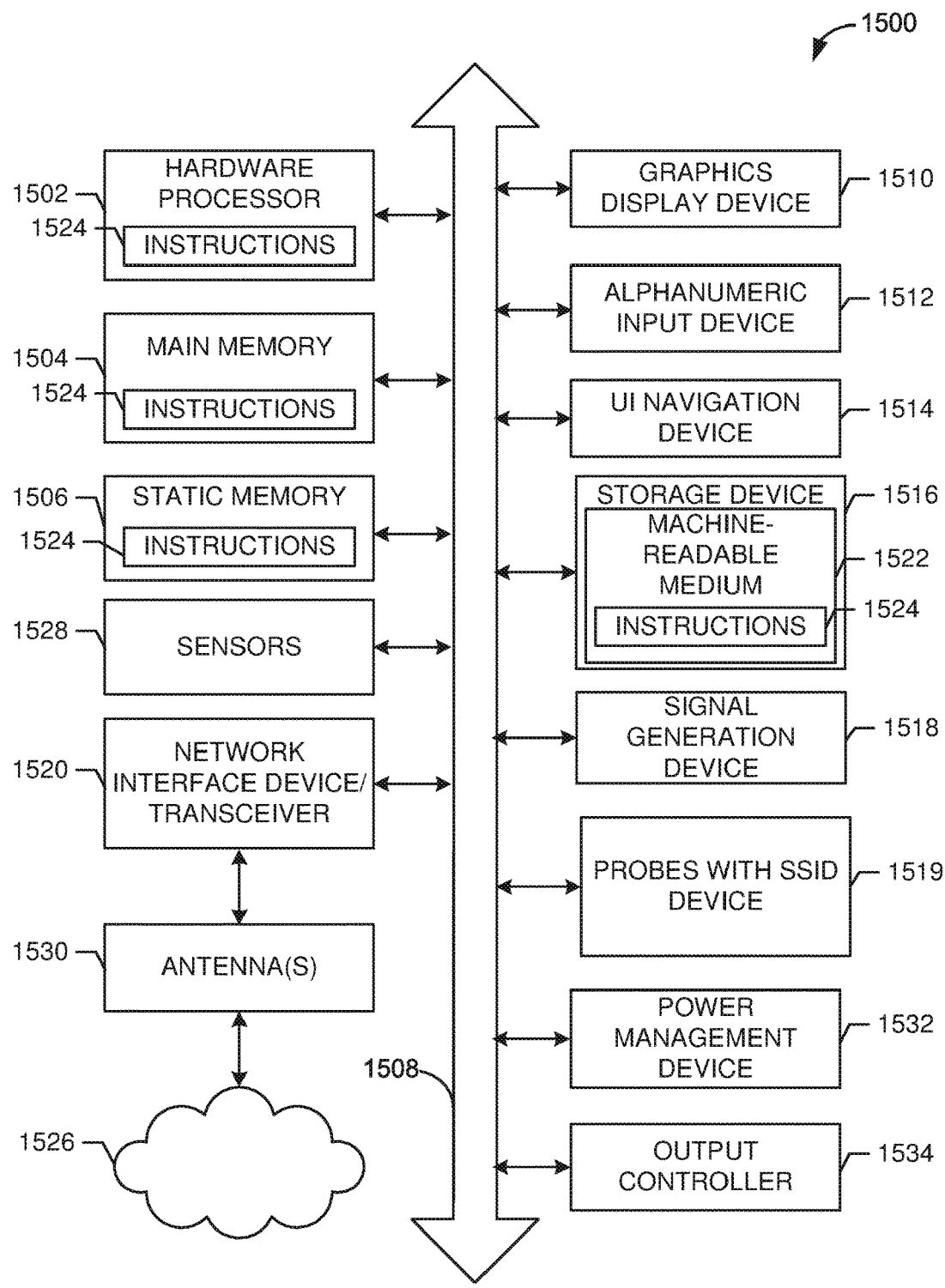
FIG. 15 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 14 and/or the example machine/system of FIG. 15.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad, 802.1 lay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In one embodiment, and with reference to FIG. 1, one or more AP(s) 102 may utilize a probes with SSID 142 with one or more user devices 120.

It is understood that the above descriptions are for purposes of illustration and are not meant to be limiting.

Figure 2:
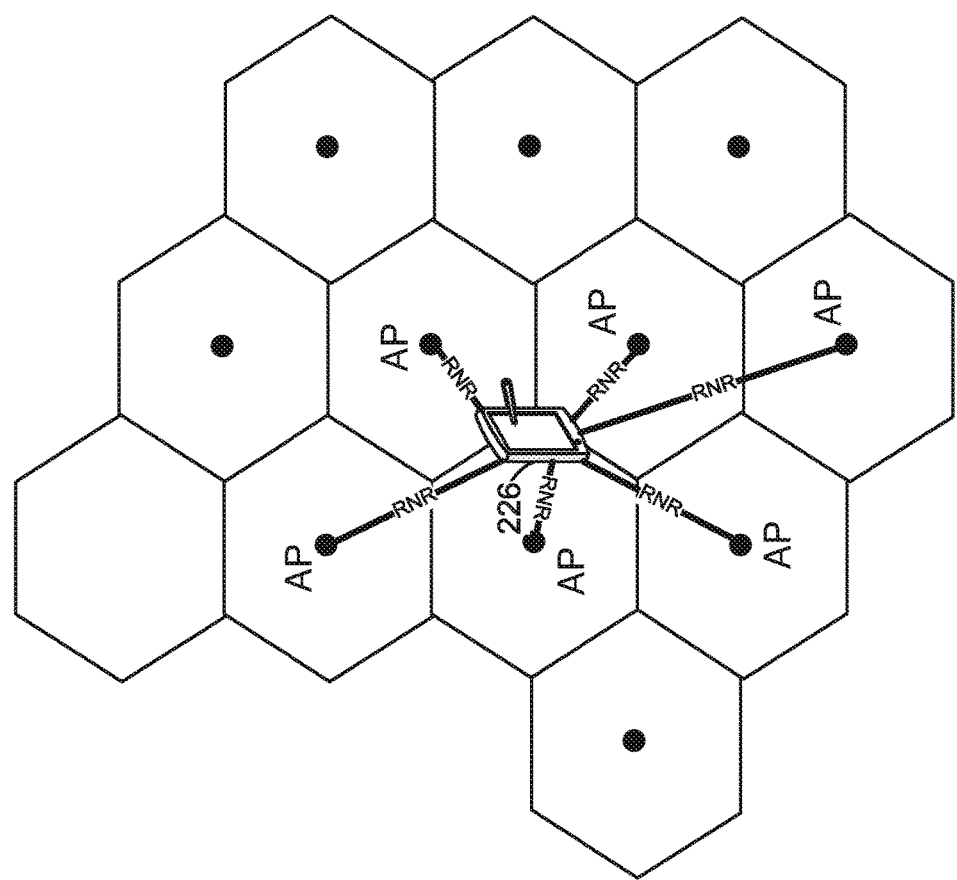
FIG. 2 depicts an illustrative schematic diagram for probes with SSID, in accordance with one or more example embodiments of the present disclosure.

FIG. 2 depicts an illustrative schematic diagram for probes with SSID, in accordance with one or more example embodiments of the present disclosure.

Referring to FIG. 2, there is shown a plurality of APs in an ESS n communication with a user device 226 (STA).

In some scenarios, the STA may want to associate with the closest AP of an enterprise ESS (same SSID) that is planned with multiple APs deployed with specific frequency reuse.

In one or more embodiments, a probes with SSID system may facilitate that a STA may scan a lower frequency band (e.g., 2.4/5 GHz band) in order to receive the beacons containing the reduced neighbor report (RNR) from all APs operating at 6 GHz. That is, instead of having the STA scan all frequencies, including APs operating at 6 GHz. This would prevent causing a probe storm that could result from receiving multiple probe responses from multiple APs operating at various bands.

In one or more embodiments, a probes with SSID system may facilitate that the RNR from APs operating at a lower frequency band may comprise information that lists various APs operating at a higher frequency band (e.g., 6 GHz). The STA may decode the RNR received from the APs at the lower frequency band and extract AP information that is associated with the higher frequency band (e.g., 6 GHz). Based on the information received, the STA may select only the APs corresponding to the SSID of interest and classify them to keep only the ones with the highest received signal strength indicator (RSSI) (measured at 2.4/5 GHz on the co-located beacon). Based on that, the STAs will not need to send a full broadcast probe to that SSID in every channel at 6 GHz and get a probe response to all APs at 6 GHz, but only select a few of those.

If the BSSID is included in the RNR, the STA can send a probe request which is specifically sent to a particular BSSID. However, if it wants to send it to 2 or 3 BSSIDs, currently it will need to send 2 or 3 probe requests one after the other.

If the RNR does not contain the BSSID and contains only the short SSID (4 Bytes), it is currently not possible for the STA to send a probe request at 6 GHz.

A probe request frame can include a "SSID List element" that can contain multiple SSID elements of variable length. An AP receiving this probe request and with an SSID matching one of the SSID in the list may respond with a probe response to this probe request.

In one or more embodiments, a probes with SSID system may define a new element called "BSSID List element" that contains a variable number of BSSID fields/elements. An AP receiving a probe request with the BSSID List element included, and that has a BSSID that matches one of the BSSIDs in the list may send a probe response in response to the probe request.

In one or more embodiments, a probes with SSID system may define a new element called "Short SSID List element" that contains a variable number of Short SSID fields/elements (of 4 Bytes each). An AP receiving a probe request with the Short SSID List element included, and that has a Short SSID that matches one of the Short SSIDs in the list may send a probe response in response to the probe request.

In one or more embodiments, a probes with SSID system may define a new element called "Short SSID element" that contains a single SSID field (of 4 Bytes). An AP receiving a probe request with the Short SSID element included, and that has a Short SSID that matches the Short SSID element may send a probe response in response to the probe request.

FIGS. 3-12 depict illustrative schematic diagrams for A-MPDU subframe encoding, in accordance with one or more example embodiments of the present disclosure.

Figure 3:
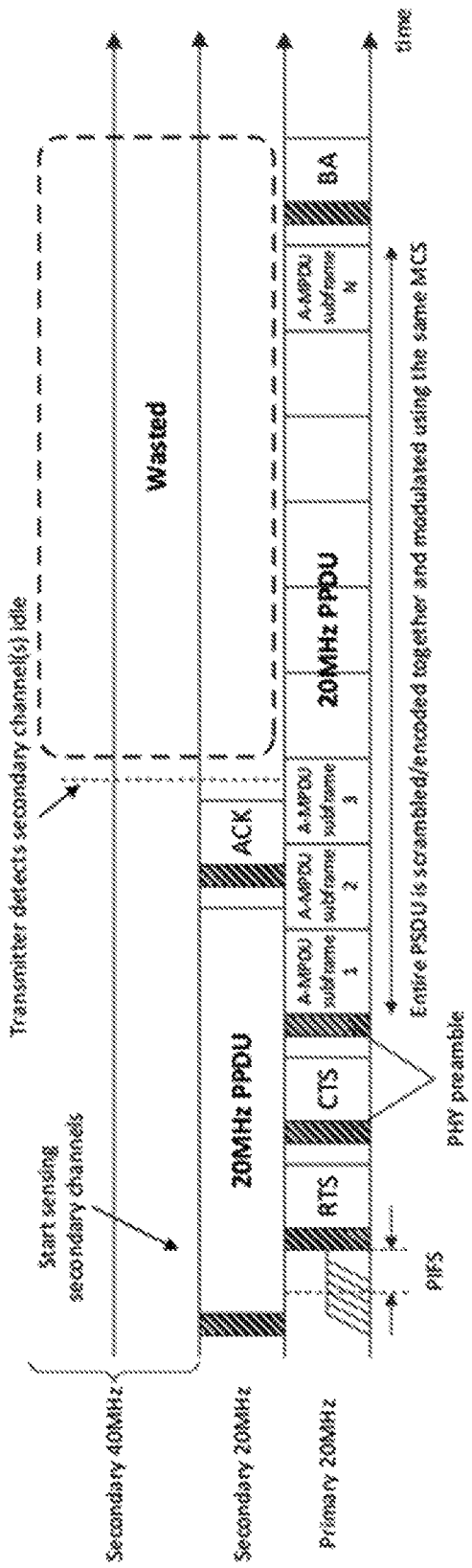
FIGS. 3-12 depict illustrative schematic diagrams for aggregate medium access control (MAC) protocol data unit (A-MPDU) subframe encoding, in accordance with one or more example embodiments of the present disclosure.

Current static, per-PSDU scrambling/encoding rule prevents the transmitter from dynamically changing the transmission BW until it completes the transmission of the on-going PPDU, as shown in FIG. 3.

Referring to FIG. 3, there is shown a Per-PSDU encoding in current 802.11 systems. The transmitter cannot change the transmission BW in the middle of on-going PPDU transmission even if it discovers available secondary channels.

In one or more embodiments, a A-MPDU subframe encoding system may facilitate changes in the PPDU frame format to enable per-A-MPDU-subframe encoding scheme.

Figure 4:
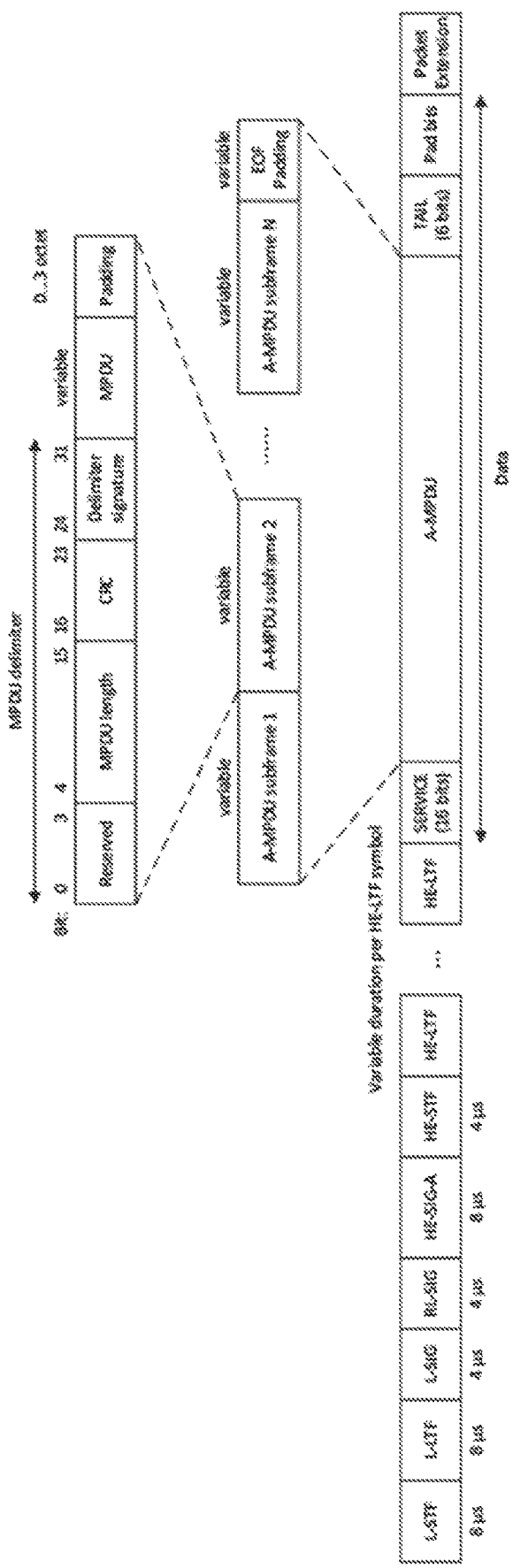

Referring to FIG. 4, there is shown an 802.11ax HE (High Efficiency) PPDU format with multiple A-MPDU subframes in a PSDU (PLCP service data unit). The entire PSDU including multiple A-MPDU subframes are scrambled and encoded using the same configuration.

Figure 5:
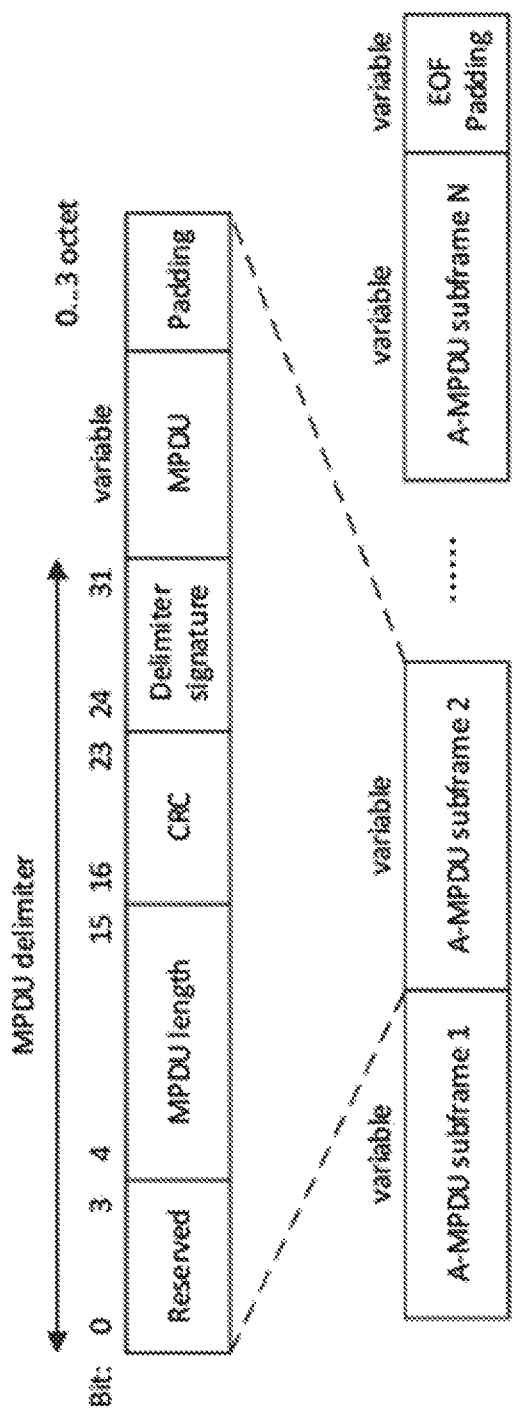

Referring to FIG. 5, there is shown the current A-MPDU frame format.

Figure 6:
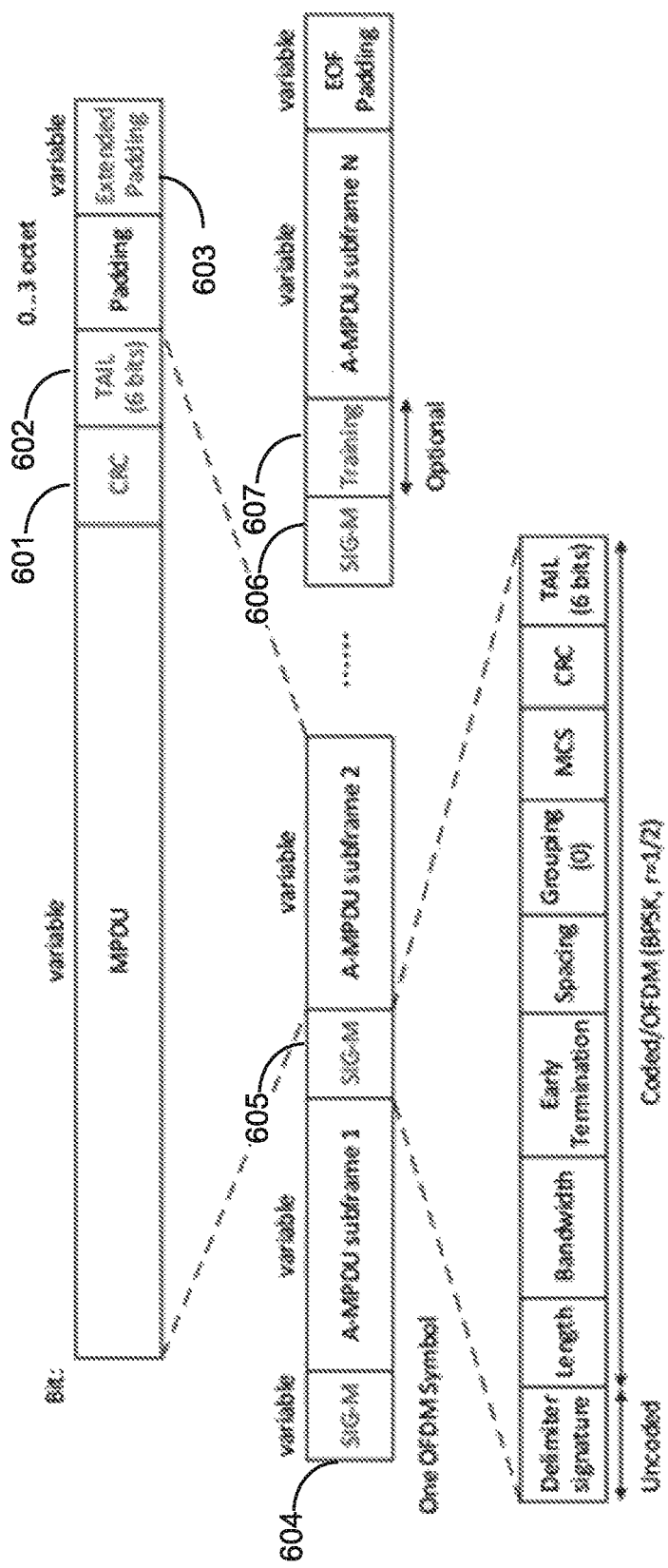

Referring to FIG. 6, there is shown a proposed 802.11 A-MPDU frame format, in accordance with one or more example embodiments of the present disclosure, which introduces the new fields 601, 602, 603, 604, 605, 606, and 607.

In one embodiment, a Signaling field (denoted as "SIG-M") (e.g., fields 604, 605, and 606) may be a new signaling field that will be inserted at the beginning of each (or group of) A-MPDU subframe(s). This signaling field may comprise one or more of the following subfields.

In one embodiment, a delimiter signature (optional) may be a delimiter signature for the receiver to search the A-MPDU subframe boundaries in case it fails to decode the previous SIG-M subfield. Note that the design of the delimiter signature should have good correlation properties and can be easily identified. Also, note that the detailed design and length of the delimiter signature subfield in SIG-M is TBD based on detection requirements.

In one embodiment, a Length field may indicate the length of the next A-MPDU subframe or multiple A-MPDU subframes if the value of "Grouping" subfield is set to 1.

In one embodiment, a Bandwidth field may indicate the transmission bandwidth of the next A-MPDU subframe.

In one embodiment, an Early Termination field (1 bit) may indicate that the transmitter is early terminating the current A-MPDU and there is no A-MPDU subframe after SIG-M when set to "1". Upon the reception of this early termination indication, the receiver processes the current SIG-M and re-initiates the RX chain and enter the packet acquisition/detection state.

In one embodiment, a Spacing field (1 bit) may indicate that there is a spacing (e.g., SIFS) at the end of the current SIG-M symbol transmission when set to 1. For example, the transmitter can introduce such spacing when it changes transmission bandwidth for the next A-MPDU subframe transmission to provide enough time for the transmitter and receiver to reconfigure their TX/RX chains to process the next A-MPDU subframe on a wider (or narrower) bandwidth.

In one embodiment, a Grouping field (1 bit) may indicate that multiple A-MPDU subframes are transmitted before the next SIG-M signaling field. In this case, the value of "Length" subfield in SIG-M indicates the length of multiple A-MPDU subframes. Each grouped A-MPDU subframe has MPDU delimiter field and the receiver uses the MPDU delimiter field to identify the length of each A-MPDU subframe and process them individually.

In one embodiment, an MCS field may indicate the MCS used for the next A-MPDU subframe or next A-MPDU subframes if grouped.

In one embodiment, a CRC field may be a CRC for SIG-M field.

In one embodiment, a TAIL field (optional) maybe 6 zero bits to flush the Viterbi decoder (in case of convolutional code). Note that the Tail bits are optional and it might not be needed depending on the coding scheme used for the signaling field, e.g., LDPC. Also, the Tail bits could be less than 6 bits depending on the codes/polynomials.

In one or more embodiments, the SIG-M field (except the delimiter signature) can be encoded using convolution (BCC) encoder at the rate 1/2 and modulated using BPSK (binary phase-shift keying). The length of the SIG-M symbol can vary depending on the transmission bandwidth (e.g., 20, 40, 80 MHz), FFT size, and the size (i.e., bit counts) of the SIG-M field. For example, the SIG-M symbol can be truncated to further reduce the overhead. As mentioned above, another coding could be used, e.g., LDPC, which may not require any Tail bits.

(ii) Training field (optional, denoted as "Training") (e.g., field 607): This is an optional field that is present only when the next A-MPDU subframe is transmitted over a wider BW than the previous A-MPDU subframe (e.g., 20 MHz→40 MHz). For the training field, legacy LTF (long training field) can be used for channel estimation over the new (wider) BW.

Note that it is assumed that frequency and timing were previously estimated and currently being tracked at the time of the transition, thus additional training for these functions is assumed as not required. It is assumed that the new wider BW LTF (needed for channel estimation) could potentially be used to further improve the estimation accuracy for more advanced implementations, but likely not necessary.

(iii) Changes to A-MPDU subframe:

MPDU delimiter: MPDU delimiter can be removed from the A-MPDU subframe because SIG-M conveys the same information including the delimiter signature, length, etc.

CRC (field 601): CRC for the A-MPDU subframe.

Tail bits (optional, denoted as "TAIL") (e.g., field 602: Another TAIL bits at the end of A-MPDU subframe to flush the Viterbi decoder. Again, note that the Tail bits are optional and it might not be needed depending on the coding scheme used for the A-MPDU subframe, e.g., LDPC. Also, the Tail bits could be less than 6 bits depending on the codes/polynomials.

Extended padding (optional) (e.g., field 603): In case the transmitter changes transmission parameters in SIG-M, such as BW and MCS, the receiver may require additional time to prepare its receiver chain (e.g., PHY state machine) before the start of processing the following training field and A-MPDU subframe. In that case, the PHY transmit side processing may add additional padding at the end of the A-MPDU subframe. The padding can also be used to align the A-MPDU subframe to OFDM symbol boundaries.

Note that while SIG-M field can be contained in one (or truncated) OFDM symbol, the fact that the receiver has to cycle through multiple states in RX PHY/MAC state machine for each A-MPDU subframe can incur additional processing latency in PHY and MAC. For example, the receiver has to go through the "End of PSDU/MPDU RX" and "End of Wait" states per A-MPDU subframe instead of staying at the "Decode Symbol" state until the end of PPDU.

In one or more embodiments, the potential processing overhead and processing delay can be reduced by inserting SIG-M per a group of A-MPDU subframes, as shown in FIG. 5. In this case, the LENGTH subfield in SIG-M indicates the length of the group of A-MPDU subframes that use the same transmission configuration indicated in the SIG-M. The transmitter needs to preserve the MPDU delimiter field to identify the boundaries of each A-MPDU subframe, as shown in FIG. 7.

Figure 7:
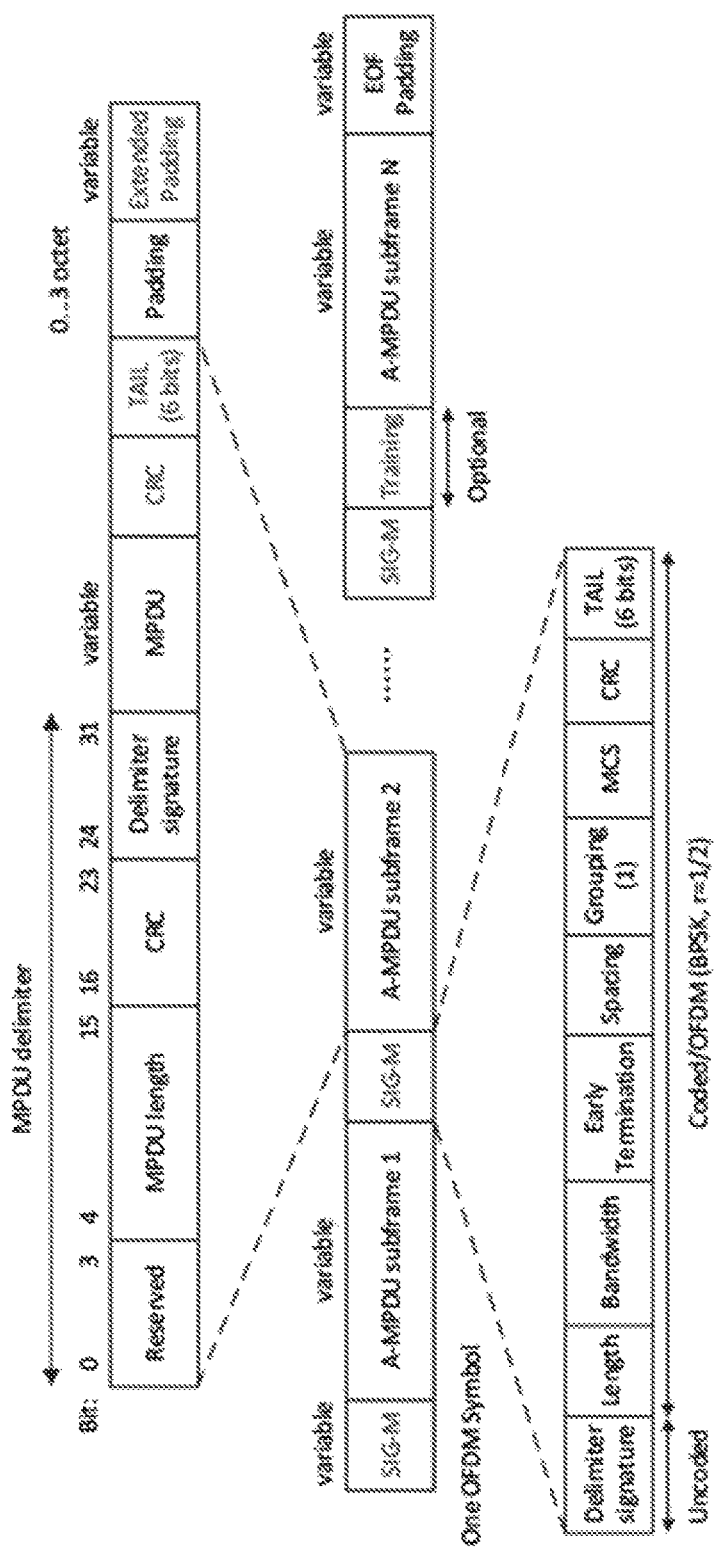

Referring to FIG. 7, there is shown a proposed A-MPDU subframe format with SIG-M per multiple A-MPDU subframes.

In one or more embodiments, the group of A-MPDU subframes are scrambled (or descrambled) and encoded (or decoded) together at the transmitter (receiver). After the decoding/descrambling, the receiver identifies each A-MPDU subframe based on the information indicated in the MPDU delimiter field, including the LENGTH and Delimiter signature subfields. Note that the SIG-M does not necessarily aligned with A-MPDU subframe boundaries to reduce the overhead. The SIG-M field can be inserted in multiple locations with a PPDU. If a SIG-M signaling field inserted in the middle of A-MPDU subframe indicates early transmission termination (i.e., the value of "Early Termination" subfield set to 1), then the receiver will immediately stop processing the current PPDU and the last A-MPDU subframe might be discarded.

In one or more embodiments, while the proposed per-A-MPDU encoding provides additional flexibility in PPDU transmission, it incurs additional processing overhead at the transmitter and receiver. The transmitter (e.g., Wi-Fi AP) can decide the transmission mode depending on various factors, e.g., length of the PPDU, traffic load on secondary channels, etc., and indicate whether it will perform per-A-MPDU-subframe encoding in the PHY header.

Figure 8:
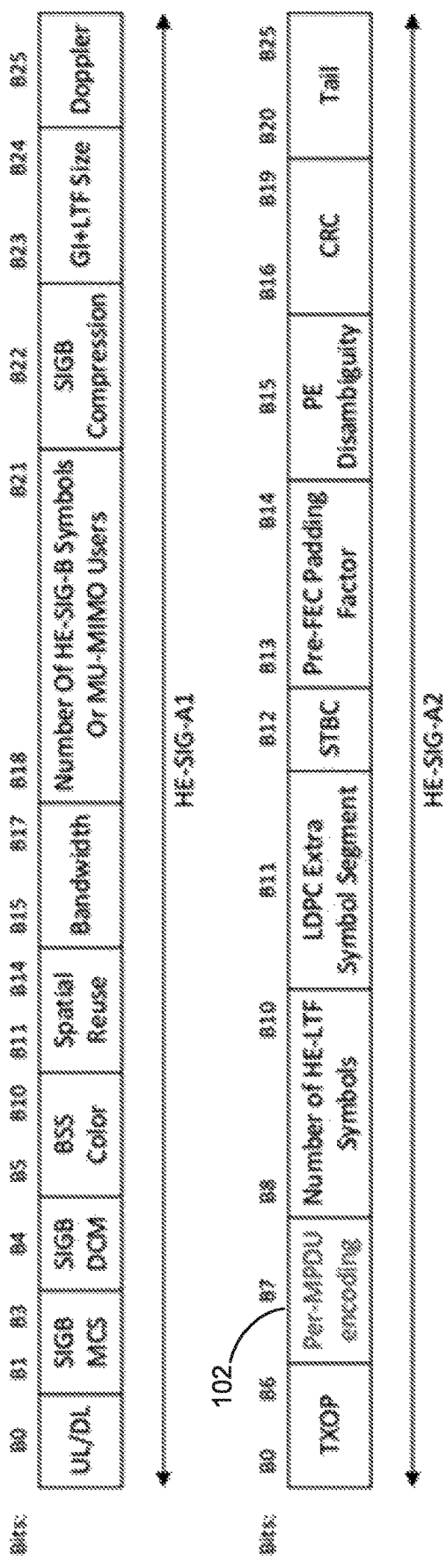

Referring to FIG. 8, there is shown an example implementation of the "Per-MPDU encoding" indication bit in the HE-SIG-A2 field. If the "Per-MPDU encoding" bit is set to "1 (enabled)", then the receiver will perform per-A-MPDU-subframe decoding/descrambling based on the information indicated in the SIG-M field; otherwise, if it is set to "0 (disabled)", then the receiver will decode/descramble the entire PSDU based on the information indicated in HE-SIG fields.

Note that the frame format shown in FIG. 8 is an example for illustration, and such an indication field can be defined in a different part of the PHY preamble or it can be part of a newly designed PHY preamble in next-gen. Wi-Fi.

Figure 9:
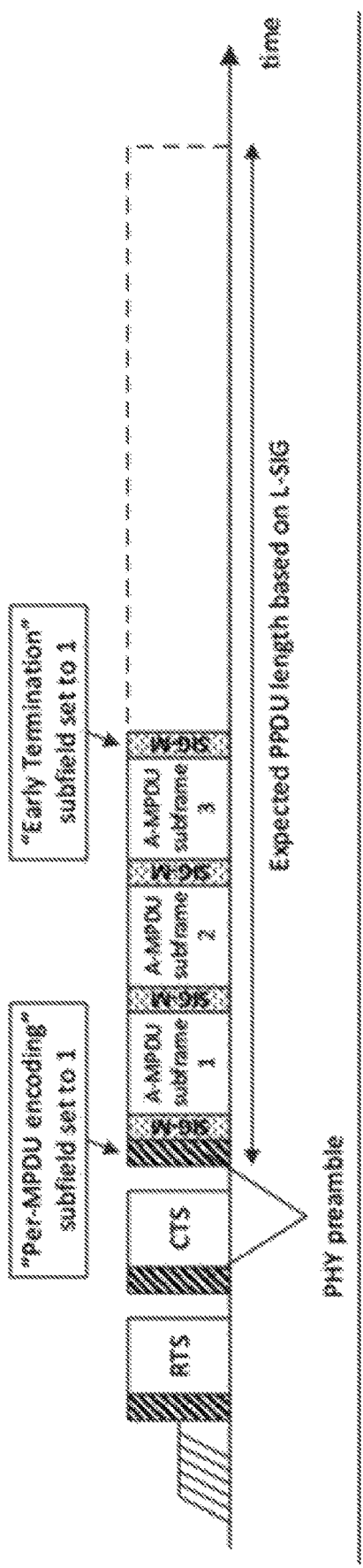

Referring to FIG. 9, there is shown an example of behavior when the transmitter uses the SIG-M signaling field to indicate the early transmission termination of the on-going PPDU transmission. The transmitter sets the value of "Early Termination" subfield to 1 to indicate that the current SIG-M is the end of the PPDU. The receiver can still decode the previously received (and separately encoded) A-MPDU subframes. After the early termination indication in SIG-M, the receiver resets the N_symbol value to 0 and resets the RX chain to enter packet acquisition mode.

Figure 10:
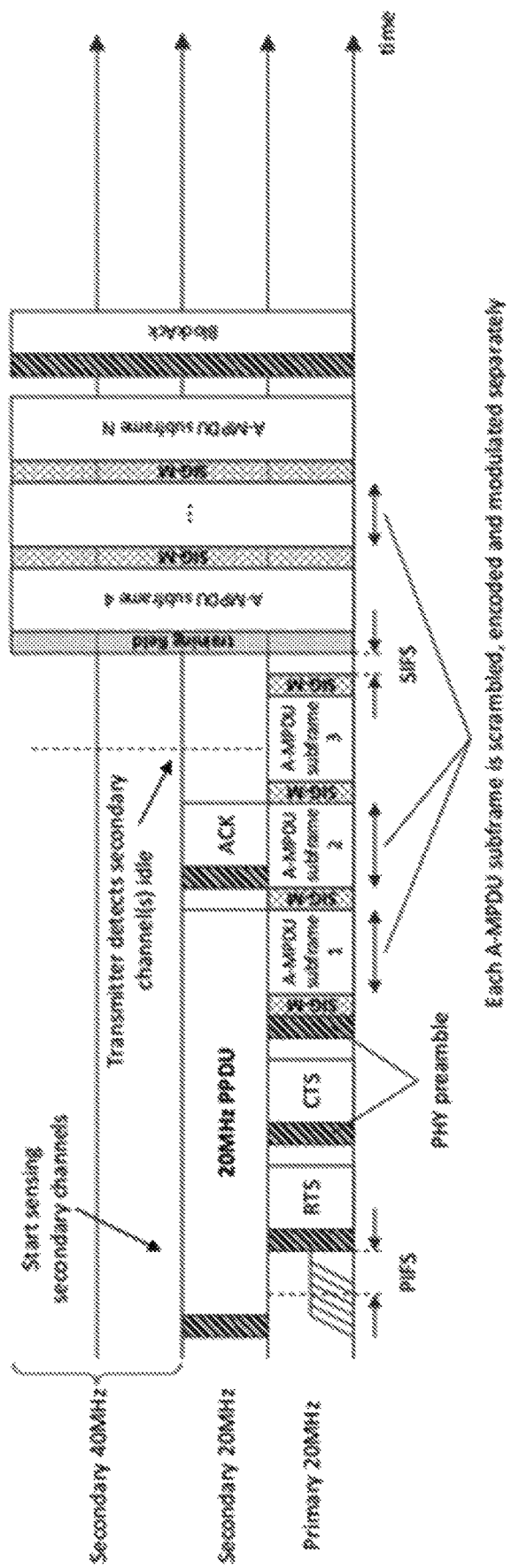

Referring to FIG. 10, there is shown an example behavior of the A-MPDU transmission with the proposed per-A-MPDU-subframe encoding scheme. For example, if the transmitter detects that secondary channels become available while transmitting the $3^{rd}$ A-MPDU subframe, then the transmitter can adjust the transmission BW and MCS from the next A-MPDU-subframe, as shown in FIG. 10. Note that in this case, the SIG-M after the $3^{rd}$ A-MPDU subframe sets the value of "Bandwidth" to 80 MHz, and sets the value of "Spacing" subfield to "1" to notify the receiver that there is a gap between the current SIG-M and the training fields (over 80 MHz). This will provide the receiver enough time to prepare its receiver chain to complete the processing of the SIG-M field and process the new training fields over the wider channel BW.

Figure 11:
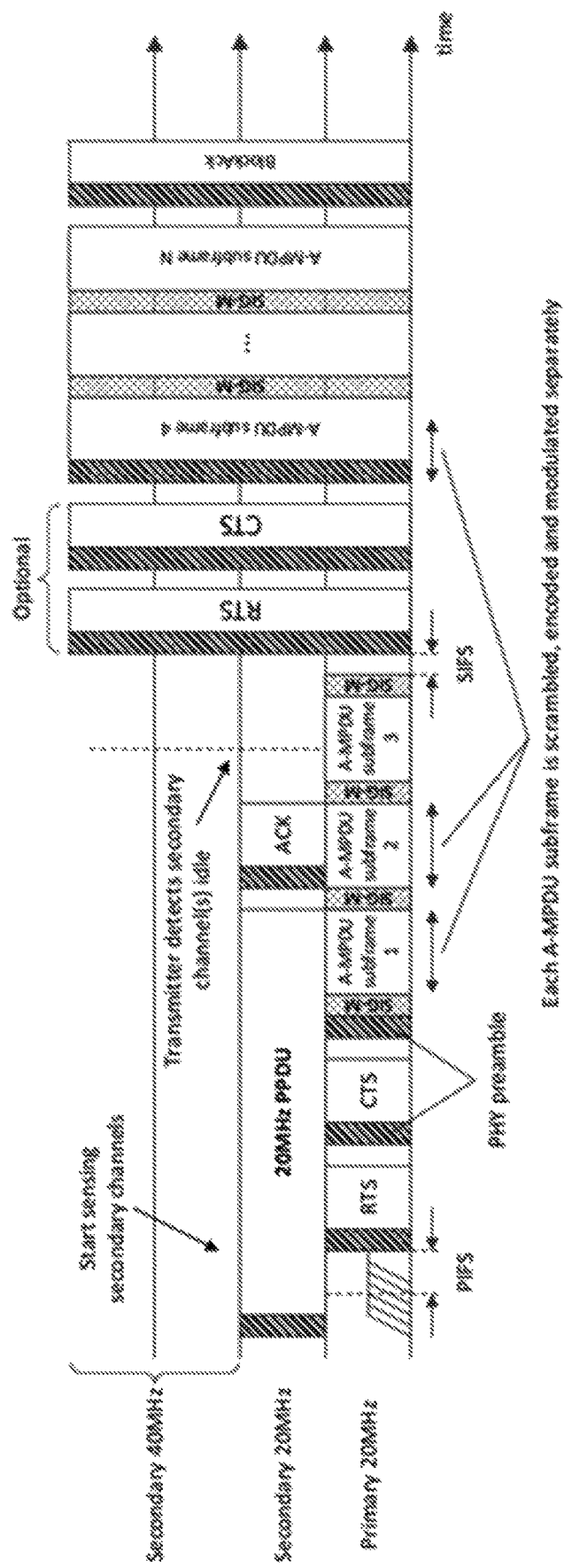

Referring to FIG. 11, there is shown a proposed behavior with (optional) RTS/CTS frame exchange over a wider channel bandwidth.

Figure 12:
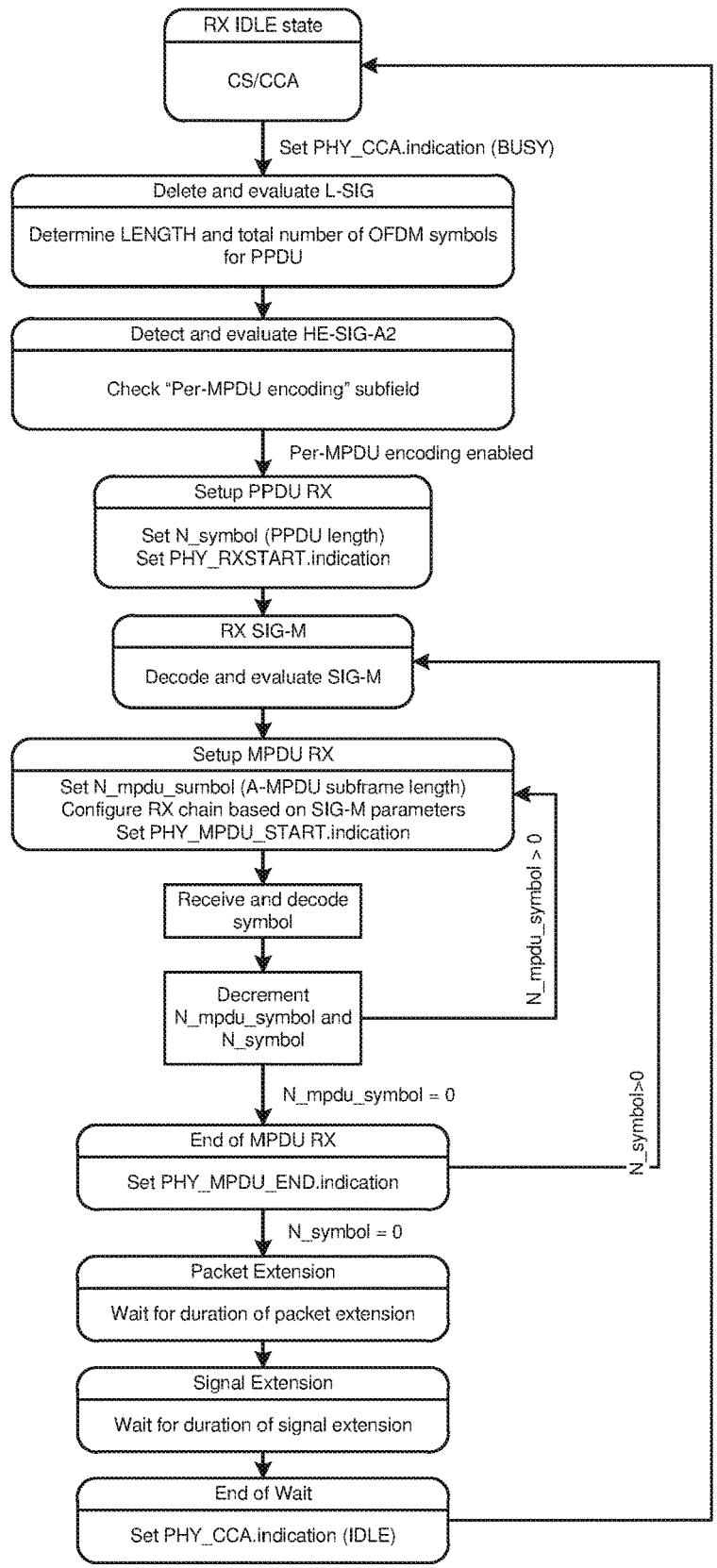

Referring to FIG. 12, there is shown an example flowchart for PHY receive state machine. The receiver will maintain two parameters, i.e., N_symbol and N_mpdu_symbol, to track the number of OFDM symbols for the entire PPDU and each A-MPDU-subframe. The receiver inserts PHY_MPDU_START.indication and PHY_MPDU_END.indication to MAC to inform the start and end of each MPDU processing. It is understood that the above descriptions are for purposes of illustration and are not meant to be limiting.

Figure 13:
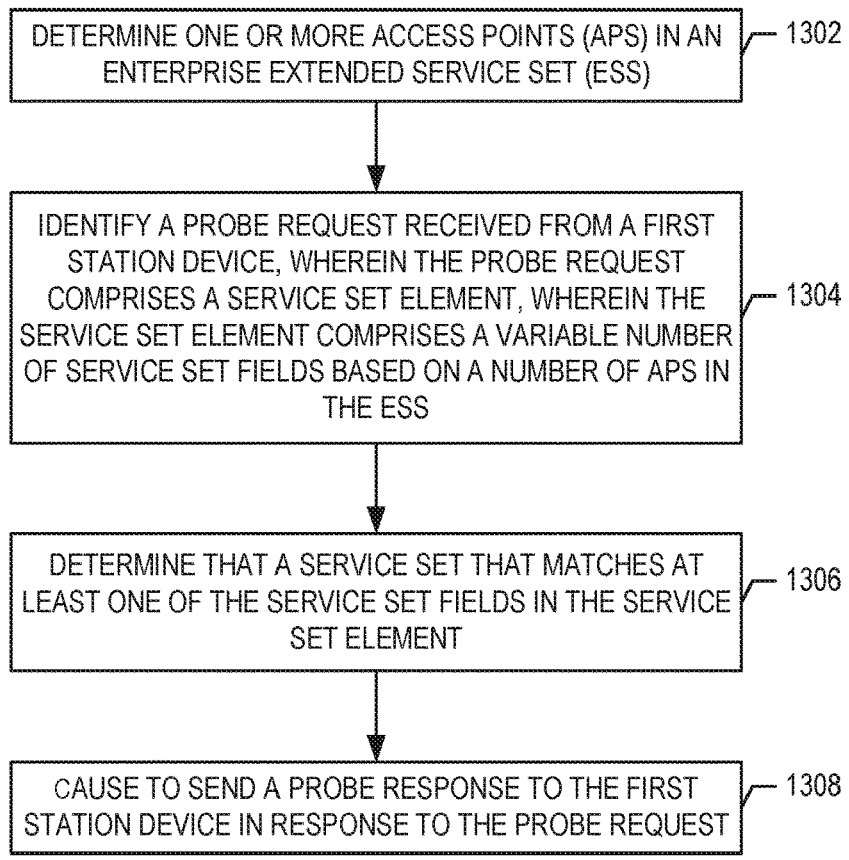
FIG. 13 illustrates a flow diagram of an illustrative process for probes with SSID system, in accordance with one or more example embodiments of the present disclosure.

FIG. 13 illustrates a flow diagram of illustrative process 1300 for a probes with SSID system, in accordance with one or more example embodiments of the present disclosure.

At block 1302, a device (e.g., the user device(s) 120 and/or the AP 102 of FIG. 1) may determine one or more access points (APs) in an enterprise extended service set (ESS). Each of the one or more APs in the enterprise ESS have a same service set identifier (SSID).

At block 1304, the device may identify a probe request received from a first station device, wherein the probe request comprises a service set element, wherein the service set element comprises a variable number of service set fields based on a number of APs in the ESS. The service set element may be based on a scan performed at the first station device using a low frequency band. The service set element has a size of at least four bytes. The service set element may comprise a BSSID list element, a short SSID list element, or a short SSID element. The BSSID list element, the short SSID list element, or the short SSID element, each comprise a variable number of service set elements.

At block 1306, the device may determine that a service set that matches at least one of the service set fields in the service set element.

At block 1308, the device may cause to send a probe response to the first station device in response to the probe request.

It is understood that the above descriptions are for purposes of illustration and are not meant to be limiting.

FIG. 14 shows a functional diagram of an exemplary communication station 1400, in accordance with one or more example embodiments of the present disclosure. In one embodiment, FIG. 14 illustrates a functional block diagram of a communication station that may be suitable for use as an AP 102 (FIG. 1) or a user device 120 (FIG. 1) in accordance with some embodiments. The communication station 1400 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 1400 may include communications circuitry 1402 and a transceiver 1410 for transmitting and receiving signals to and from other communication stations using one or more antennas 1401. The communications circuitry 1402 may include circuitry that can operate the physical layer (PHY) communications and/or medium access control (MAC) communications for controlling access to the wireless medium, and/or any other communications layers for transmitting and receiving signals. The communication station 1400 may also include processing circuitry 1406 and memory 1408 arranged to perform the operations described herein. In some embodiments, the communications circuitry 1402 and the processing circuitry 1406 may be configured to perform operations detailed in the above figures, diagrams, and flows.

In accordance with some embodiments, the communications circuitry 1402 may be arranged to contend for a wireless medium and configure frames or packets for communicating over the wireless medium. The communications circuitry 1402 may be arranged to transmit and receive signals. The communications circuitry 1402 may also include circuitry for modulation/demodulation, upconversion/downconversion, filtering, amplification, etc. In some embodiments, the processing circuitry 1406 of the communication station 1400 may include one or more processors. In other embodiments, two or more antennas 1401 may be coupled to the communications circuitry 1402 arranged for sending and receiving signals. The memory 1408 may store information for configuring the processing circuitry 1406 to perform operations for configuring and transmitting message frames and performing the various operations described herein. The memory 1408 may include any type of memory, including non-transitory memory, for storing information in a form readable by a machine (e.g., a computer). For example, the memory 1408 may include a computer-readable storage device, read-only memory (ROM), random-access memory (RAM), magnetic disk storage media, optical storage media, flash-memory devices and other storage devices and media.

In some embodiments, the communication station 1400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 1400 may include one or more antennas 1401. The antennas 1401 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 1400 may include one or more of a keyboard, a display, a non-volatile memory port, multiple antennas, a graphics processor, an application processor, speakers, and other mobile device elements. The display may be an LCD screen including a touch screen.

Although the communication station 1400 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 1400 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 1400 may include one or more processors and may be configured with instructions stored on a computer-readable storage device.

FIG. 15 illustrates a block diagram of an example of a machine 1500 or system upon which any one or more of the techniques (e.g., methodologies) discussed herein may be performed. In other embodiments, the machine 1500 may operate as a standalone device or may be connected (e.g., networked) to other machines. In a networked deployment, the machine 1500 may operate in the capacity of a server machine, a client machine, or both in server-client network environments. In an example, the machine 1500 may act as a peer machine in peer-to-peer (P2P) (or other distributed) network environments. The machine 1500 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 1500 may include a hardware processor 1502 (e.g., a central processing unit (CPU), a graphics processing unit (GPU), a hardware processor core, or any combination thereof), a main memory 1504 and a static memory 1506, some or all of which may communicate with each other via an interlink (e.g., bus) 1508. The machine 1500 may further include a power management device 1532, a graphics display device 1510, an alphanumeric input device 1512 (e.g., a keyboard), and a user interface (UI) navigation device 1514 (e.g., a mouse). In an example, the graphics display device 1510, alphanumeric input device 1512, and UI navigation device 1514 may be a touch screen display. The machine 1500 may additionally include a storage device (i.e., drive unit) 1516, a signal generation device 1518 (e.g., a speaker), a probes with SSID device 1519, a network interface device/transceiver 1520 coupled to antenna(s) 1530, and one or more sensors 1528, such as a global positioning system (GPS) sensor, a compass, an accelerometer, or other sensor. The machine 1500 may include an output controller 1534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor. The baseband processor may be configured to generate corresponding baseband signals. The baseband processor may further include physical layer (PHY) and medium access control layer (MAC) circuitry, and may further interface with the hardware processor 1502 for generation and processing of the baseband signals and for controlling operations of the main memory 1504, the storage device 1516, and/or the probes with SSID device 1519. The baseband processor may be provided on a single radio card, a single chip, or an integrated circuit (IC).

The storage device 1516 may include a machine readable medium 1522 on which is stored one or more sets of data structures or instructions 1524 (e.g., software) embodying or utilized by any one or more of the techniques or functions described herein. The instructions 1524 may also reside, completely or at least partially, within the main memory 1504, within the static memory 1506, or within the hardware processor 1502 during execution thereof by the machine 1500. In an example, one or any combination of the hardware processor 1502, the main memory 1504, the static memory 1506, or the storage device 1516 may constitute machine-readable media.

The probes with SSID device 1519 may carry out or perform any of the operations and processes (e.g., process 1300) described and shown above.

It is understood that the above are only a subset of what the probes with SSID device 1519 may be configured to perform and that other functions included throughout this disclosure may also be performed by the probes with SSID device 1519.

While the machine-readable medium 1522 is illustrated as a single medium, the term "machine-readable medium" may include a single medium or multiple media (e.g., a centralized or distributed database, and/or associated caches and servers) configured to store the one or more instructions 1524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 1500 and that cause the machine 1500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 1524 may further be transmitted or received over a communications network 1526 using a transmission medium via the network interface device/transceiver 1520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 1520 may include one or more physical jacks (e.g., Ethernet, coaxial, or phone jacks) or one or more antennas to connect to the communications network 1526. In an example, the network interface device/transceiver 1520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 1500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 16:
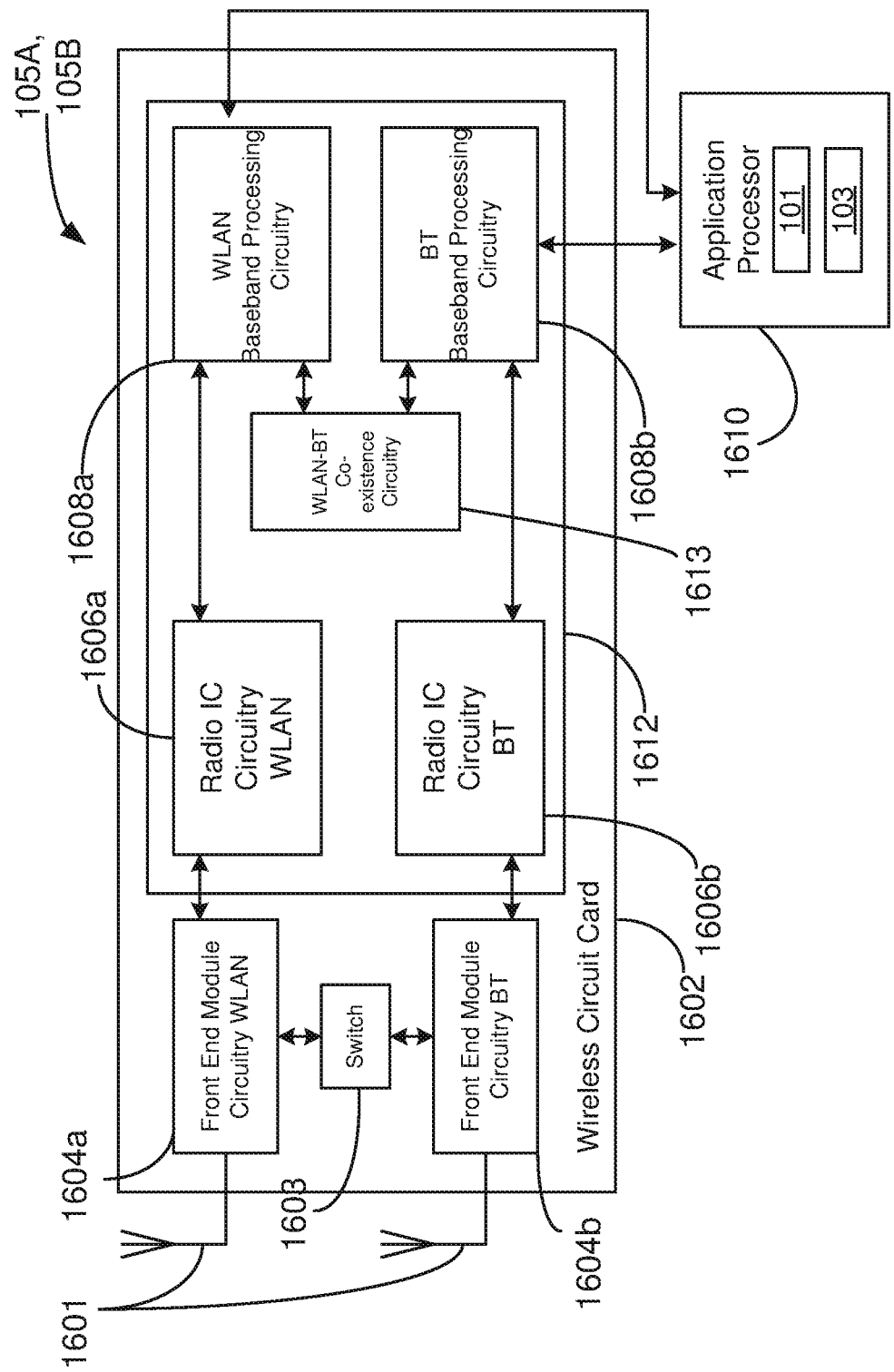
FIG. 16 is a block diagram of a radio architecture in accordance with some examples.

FIG. 16 is a block diagram of a radio architecture 105A, 105B in accordance with some embodiments that may be implemented in any one of the example AP 102 and/or the example user device 120 of FIG. 1. Radio architecture 105A, 105B may include radio front-end module (FEM) circuitry 1604a-b, radio IC circuitry 1606a-b and baseband processing circuitry 1608a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1604a-b may include a WLAN or Wi-Fi FEM circuitry 1604a and a Bluetooth (BT) FEM circuitry 1604b. The WLAN FEM circuitry 1604a may include a receive signal path comprising circuitry configured to operate on WLAN RF signals received from one or more antennas 1601, to amplify the received signals and to provide the amplified versions of the received signals to the WLAN radio IC circuitry 1606a for further processing. The BT FEM circuitry 1604b may include a receive signal path which may include circuitry configured to operate on BT RF signals received from one or more antennas 1601, to amplify the received signals and to provide the amplified versions of the received signals to the BT radio IC circuitry 1606b for further processing. FEM circuitry 1604a may also include a transmit signal path which may include circuitry configured to amplify WLAN signals provided by the radio IC circuitry 1606a for wireless transmission by one or more of the antennas 1601. In addition, FEM circuitry 1604b may also include a transmit signal path which may include circuitry configured to amplify BT signals provided by the radio IC circuitry 1606b for wireless transmission by the one or more antennas. In the embodiment of FIG. 16, although FEM 1604a and FEM 1604b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1606a-b as shown may include WLAN radio IC circuitry 1606a and BT radio IC circuitry 1606b. The WLAN radio IC circuitry 1606a may include a receive signal path which may include circuitry to down-convert WLAN RF signals received from the FEM circuitry 1604a and provide baseband signals to WLAN baseband processing circuitry 1608a. BT radio IC circuitry 1606b may in turn include a receive signal path which may include circuitry to down-convert BT RF signals received from the FEM circuitry 1604b and provide baseband signals to BT baseband processing circuitry 1608b. WLAN radio IC circuitry 1606a may also include a transmit signal path which may include circuitry to up-convert WLAN baseband signals provided by the WLAN baseband processing circuitry 1608a and provide WLAN RF output signals to the FEM circuitry 1604a for subsequent wireless transmission by the one or more antennas 1601. BT radio IC circuitry 1606b may also include a transmit signal path which may include circuitry to up-convert BT baseband signals provided by the BT baseband processing circuitry 1608b and provide BT RF output signals to the FEM circuitry 1604b for subsequent wireless transmission by the one or more antennas 1601. In the embodiment of FIG. 16, although radio IC circuitries 1606a and 1606b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1608a-b may include a WLAN baseband processing circuitry 1608a and a BT baseband processing circuitry 1608b. The WLAN baseband processing circuitry 1608a may include a memory, such as, for example, a set of RAM arrays in a Fast Fourier Transform or Inverse Fast Fourier Transform block (not shown) of the WLAN baseband processing circuitry 1608a. Each of the WLAN baseband circuitry 1608a and the BT baseband circuitry 1608b may further include one or more processors and control logic to process the signals received from the corresponding WLAN or BT receive signal path of the radio IC circuitry 1606a-b, and to also generate corresponding WLAN or BT baseband signals for the transmit signal path of the radio IC circuitry 1606a-b. Each of the baseband processing circuitries 1608a and 1608b may further include physical layer (PHY) and medium access control layer (MAC) circuitry, and may further interface with a device for generation and processing of the baseband signals and for controlling operations of the radio IC circuitry 1606a-b.

Referring still to FIG. 16, according to the shown embodiment, WLAN-BT coexistence circuitry 1613 may include logic providing an interface between the WLAN baseband circuitry 1608a and the BT baseband circuitry 1608b to enable use cases requiring WLAN and BT coexistence. In addition, a switch 1603 may be provided between the WLAN FEM circuitry 1604a and the BT FEM circuitry 1604b to allow switching between the WLAN and BT radios according to application needs. In addition, although the antennas 1601 are depicted as being respectively connected to the WLAN FEM circuitry 1604a and the BT FEM circuitry 1604b, embodiments include within their scope the sharing of one or more antennas as between the WLAN and BT FEMs, or the provision of more than one antenna connected to each of FEM 1604a or 1604b.

In some embodiments, the front-end module circuitry 1604a-b, the radio IC circuitry 1606a-b, and baseband processing circuitry 1608a-b may be provided on a single radio card, such as wireless radio card 1602. In some other embodiments, the one or more antennas 1601, the FEM circuitry 1604a-b and the radio IC circuitry 1606a-b may be provided on a single radio card. In some other embodiments, the radio IC circuitry 1606a-b and the baseband processing circuitry 1608a-b may be provided on a single chip or integrated circuit (IC), such as IC 1612.

In some embodiments, the wireless radio card 1602 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 1608b may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 17:
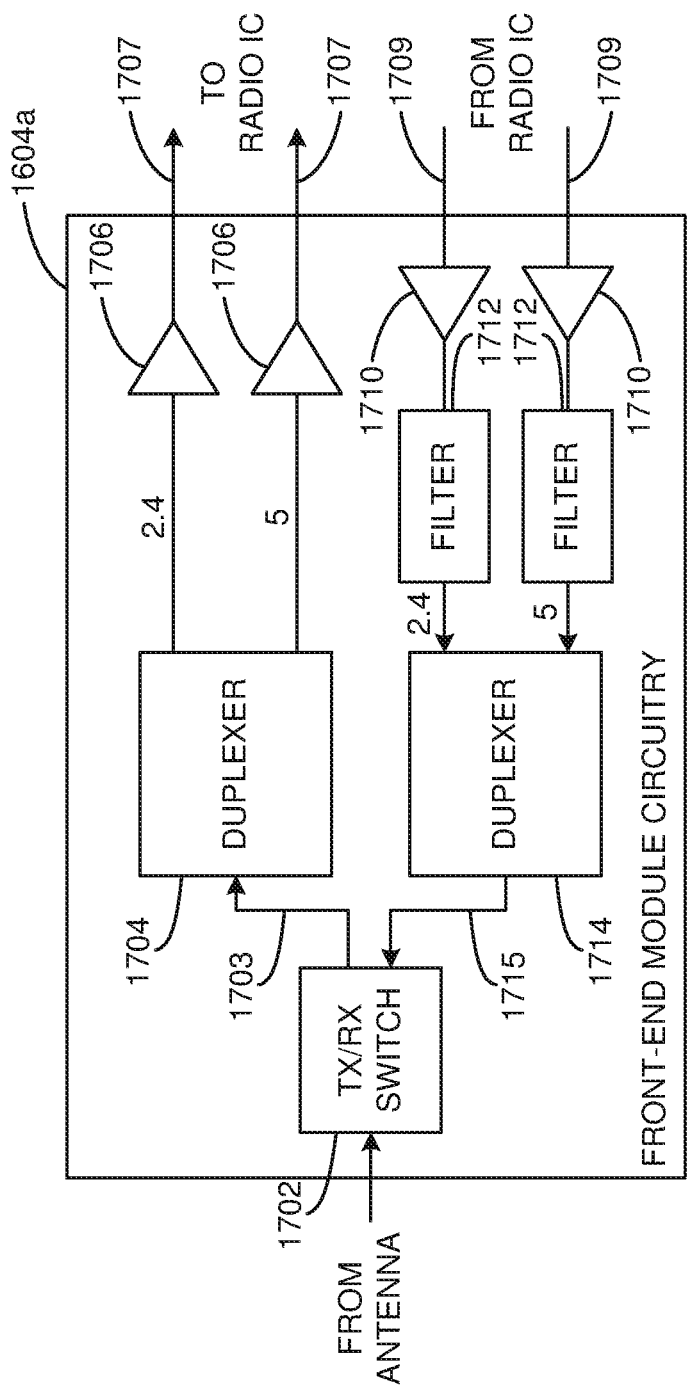
FIG. 17 illustrates an example front-end module circuitry for use in the radio architecture of FIG. 16, in accordance with one or more example embodiments of the present disclosure.

FIG. 17 illustrates WLAN FEM circuitry 1604a in accordance with some embodiments. Although the example of FIG. 17 is described in conjunction with the WLAN FEM circuitry 1604a, the example of FIG. 17 may be described in conjunction with the example BT FEM circuitry 1604b (FIG. 16), although other circuitry configurations may also be suitable.

In some embodiments, the FEM circuitry 1604a may include a TX/RX switch 1702 to switch between transmit mode and receive mode operation. The FEM circuitry 1604a may include a receive signal path and a transmit signal path. The receive signal path of the FEM circuitry 1604a may include a low-noise amplifier (LNA) 1706 to amplify received RF signals 1703 and provide the amplified received RF signals 1707 as an output (e.g., to the radio IC circuitry 1606a-b (FIG. 16)). The transmit signal path of the circuitry 1604a may include a power amplifier (PA) to amplify input RF signals 1709 (e.g., provided by the radio IC circuitry 1606a-b), and one or more filters 1712, such as band-pass filters (BPFs), low-pass filters (LPFs) or other types of filters, to generate RF signals 1715 for subsequent transmission (e.g., by one or more of the antennas 1601 (FIG. 16)) via an example duplexer 1714.

In some dual-mode embodiments for Wi-Fi communication, the FEM circuitry 1604a may be configured to operate in either the 2.4 GHz frequency spectrum or the 5 GHz frequency spectrum. In these embodiments, the receive signal path of the FEM circuitry 1604a may include a receive signal path duplexer 1704 to separate the signals from each spectrum as well as provide a separate LNA 1706 for each spectrum as shown. In these embodiments, the transmit signal path of the FEM circuitry 1604a may also include a power amplifier 1710 and a filter 1712, such as a BPF, an LPF or another type of filter for each frequency spectrum and a transmit signal path duplexer 1704 to provide the signals of one of the different spectrums onto a single transmit path for subsequent transmission by the one or more of the antennas 1601 (FIG. 16). In some embodiments, BT communications may utilize the 2.4 GHz signal paths and may utilize the same FEM circuitry 1604a as the one used for WLAN communications.

Figure 18:
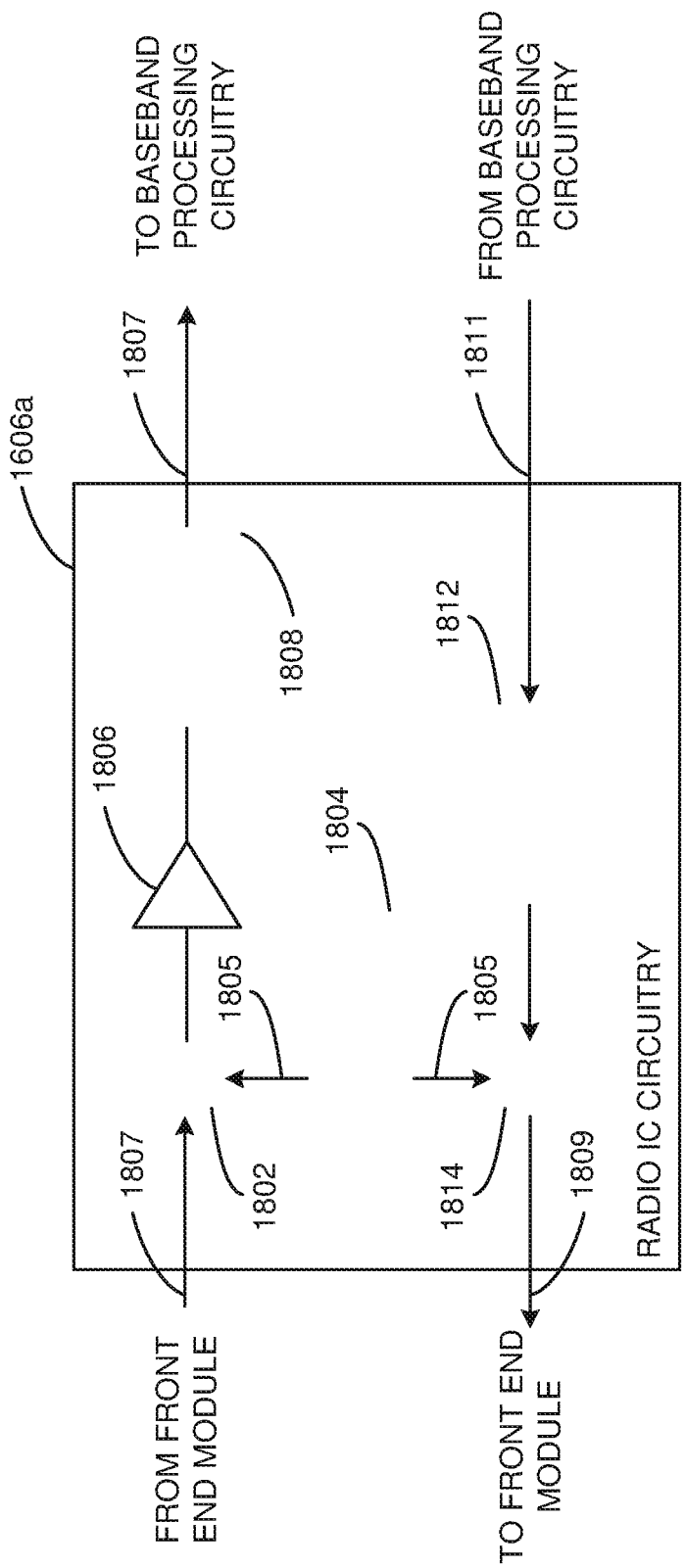
FIG. 18 illustrates an example of radio IC circuitry for use in the radio architecture of FIG. 16, in accordance with one or more example embodiments of the present disclosure.

FIG. 18 illustrates radio IC circuitry 1606a in accordance with some embodiments. The radio IC circuitry 1606a is one example of circuitry that may be suitable for use as the WLAN or BT radio IC circuitry 1606a/1606b (FIG. 16), although other circuitry configurations may also be suitable. Alternatively, the example of FIG. 18 may be described in conjunction with the example BT radio IC circuitry 1606b.

In some embodiments, the radio IC circuitry 1606a may include a receive signal path and a transmit signal path. The receive signal path of the radio IC circuitry 1606a may include at least mixer circuitry 1802, such as, for example, down-conversion mixer circuitry, amplifier circuitry 1806 and filter circuitry 1808. The transmit signal path of the radio IC circuitry 1606a may include at least filter circuitry 1812 and mixer circuitry 1814, such as, for example, up-conversion mixer circuitry. Radio IC circuitry 1606a may also include synthesizer circuitry 1804 for synthesizing a frequency 1805 for use by the mixer circuitry 1802 and the mixer circuitry 1814. The mixer circuitry 1802 and/or 1814 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 18 illustrates only a simplified version of a radio IC circuitry, and may include, although not shown, embodiments where each of the depicted circuitries may include more than one component. For instance, mixer circuitry 1814 may each include one or more mixers, and filter circuitries 1808 and/or 1812 may each include one or more filters, such as one or more BPFs and/or LPFs according to application needs. For example, when mixer circuitries are of the direct-conversion type, they may each include two or more mixers.

In some embodiments, mixer circuitry 1802 may be configured to down-convert RF signals 1707 received from the FEM circuitry 1604a-b (FIG. 16) based on the synthesized frequency 1805 provided by synthesizer circuitry 1804. The amplifier circuitry 1806 may be configured to amplify the down-converted signals and the filter circuitry 1808 may include an LPF configured to remove unwanted signals from the down-converted signals to generate output baseband signals 1807. Output baseband signals 1807 may be provided to the baseband processing circuitry 1608a-b (FIG. 16) for further processing. In some embodiments, the output baseband signals 1807 may be zero-frequency baseband signals, although this is not a requirement. In some embodiments, mixer circuitry 1802 may comprise passive mixers, although the scope of the embodiments is not limited in this respect.

In some embodiments, the mixer circuitry 1814 may be configured to up-convert input baseband signals 1811 based on the synthesized frequency 1805 provided by the synthesizer circuitry 1804 to generate RF output signals 1709 for the FEM circuitry 1604a-b. The baseband signals 1811 may be provided by the baseband processing circuitry 1608a-b and may be filtered by filter circuitry 1812. The filter circuitry 1812 may include an LPF or a BPF, although the scope of the embodiments is not limited in this respect.

In some embodiments, the mixer circuitry 1802 and the mixer circuitry 1814 may each include two or more mixers and may be arranged for quadrature down-conversion and/or up-conversion respectively with the help of synthesizer 1804. In some embodiments, the mixer circuitry 1802 and the mixer circuitry 1814 may each include two or more mixers each configured for image rejection (e.g., Hartley image rejection). In some embodiments, the mixer circuitry 1802 and the mixer circuitry 1814 may be arranged for direct down-conversion and/or direct up-conversion, respectively. In some embodiments, the mixer circuitry 1802 and the mixer circuitry 1814 may be configured for super-heterodyne operation, although this is not a requirement.

Mixer circuitry 1802 may comprise, according to one embodiment: quadrature passive mixers (e.g., for the in-phase (I) and quadrature phase (Q) paths). In such an embodiment, RF input signal 1707 from FIG. 18 may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1805 of synthesizer 1804 (FIG. 18). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1707 (FIG. 17) may comprise a balanced signal, although the scope of the embodiments is not limited in this respect. The I and Q baseband output signals may be provided to low-noise amplifier, such as amplifier circuitry 1806 (FIG. 18) or to filter circuitry 1808 (FIG. 18).

In some embodiments, the output baseband signals 1807 and the input baseband signals 1811 may be analog baseband signals, although the scope of the embodiments is not limited in this respect. In some alternate embodiments, the output baseband signals 1807 and the input baseband signals 1811 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1804 may be a fractional-N synthesizer or a fractional N/N+1 synthesizer, although the scope of the embodiments is not limited in this respect as other types of frequency synthesizers may be suitable. For example, synthesizer circuitry 1804 may be a delta-sigma synthesizer, a frequency multiplier, or a synthesizer comprising a phase-locked loop with a frequency divider. According to some embodiments, the synthesizer circuitry 1804 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1804 may be provided by a voltage controlled oscillator (VCO), although that is not a requirement. A divider control input may further be provided by either the baseband processing circuitry 1608*a-b* (FIG. 16) depending on the desired output frequency 1805. In some embodiments, a divider control input (e.g., N) may be determined from a look-up table (e.g., within a Wi-Fi card) based on a channel number and a channel center frequency as determined or indicated by the example application processor 1610. The application processor 1610 may include, or otherwise be connected to, one of the example secure signal converter 101 or the example received signal converter 103 (e.g., depending on which device the example radio architecture is implemented in).

In some embodiments, synthesizer circuitry 1804 may be configured to generate a carrier frequency as the output frequency 1805, while in other embodiments, the output frequency 1805 may be a fraction of the carrier frequency (e.g., one-half the carrier frequency, one-third the carrier frequency). In some embodiments, the output frequency 1805 may be a LO frequency (fLO).

Figure 19:
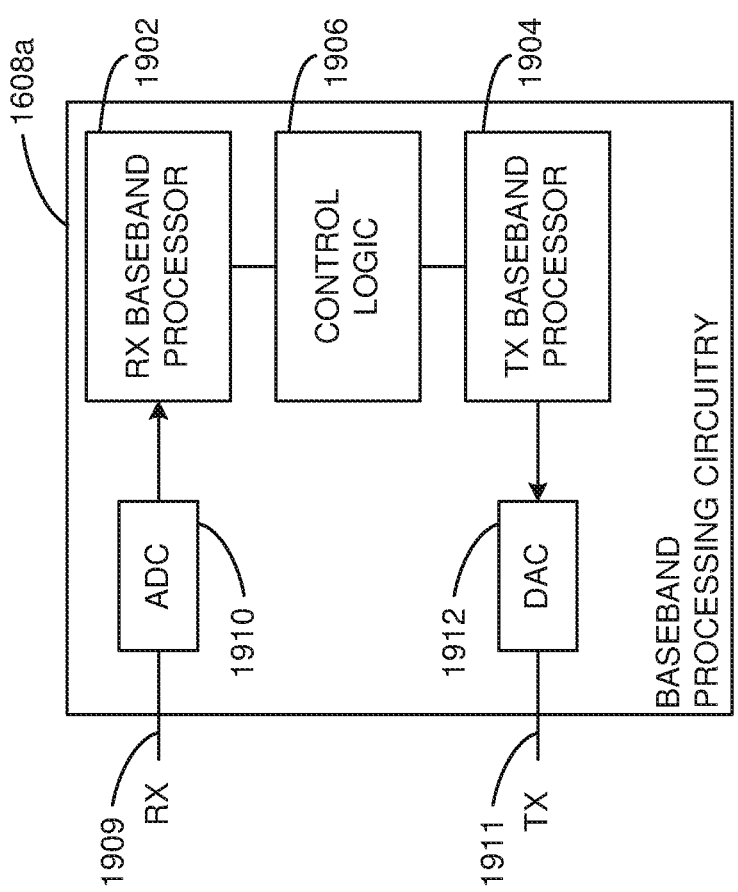
FIG. 19 illustrates an example of baseband processing circuitry for use in the radio architecture of FIG. 16, in accordance with one or more example embodiments of the present disclosure.

FIG. 19 illustrates a functional block diagram of baseband processing circuitry 1608*a* in accordance with some embodiments. The baseband processing circuitry 1608*a* is one example of circuitry that may be suitable for use as the baseband processing circuitry 1608*a* (FIG. 16), although other circuitry configurations may also be suitable. Alternatively, the example of FIG. 18 may be used to implement the example BT baseband processing circuitry 1608*b* of FIG. 16.

The baseband processing circuitry 1608*a* may include a receive baseband processor (RX BBP) 1902 for processing receive baseband signals 1809 provided by the radio IC circuitry 1606*a-b* (FIG. 16) and a transmit baseband processor (TX BBP) 1904 for generating transmit baseband signals 1811 for the radio IC circuitry 1606*a-b*. The baseband processing circuitry 1608*a* may also include control logic 1906 for coordinating the operations of the baseband processing circuitry 1608*a*.

In some embodiments (e.g., when analog baseband signals are exchanged between the baseband processing circuitry 1608*a-b* and the radio IC circuitry 1606*a-b*), the baseband processing circuitry 1608*a* may include ADC 1910 to convert analog baseband signals 1909 received from the radio IC circuitry 1606*a-b* to digital baseband signals for processing by the RX BBP 1902. In these embodiments, the baseband processing circuitry 1608*a* may also include DAC 1912 to convert digital baseband signals from the TX BBP 1904 to analog baseband signals 1911.

In some embodiments that communicate OFDM signals or OFDMA signals, such as through baseband processor 1608*a*, the transmit baseband processor 1904 may be configured to generate OFDM or OFDMA signals as appropriate for transmission by performing an inverse fast Fourier transform (IFFT). The receive baseband processor 1902 may be configured to process received OFDM signals or OFDMA signals by performing an FFT. In some embodiments, the receive baseband processor 1902 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 16, in some embodiments, the antennas 1601 (FIG. 16) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1601 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Example 1 may include a device comprising processing circuitry coupled to storage, the processing circuitry configured to: determine one or more access points (APs) in an enterprise extended service set (ESS); identify a probe request received from a first station device, wherein the probe request comprises a service set element, wherein the service set element comprises a variable number of service set fields based on a number of APs in the ESS; determine that a service set that matches at least one of the service set fields in the service set element; and cause to send a probe response to the first station device in response to the probe request.

Example 2 may include the device of example 1 and/or some other example herein, wherein each of the one or more APs in the enterprise ESS have a same service set identifier (SSID).

Example 3 may include the device of example 1 and/or some other example herein, wherein the service set element may be based on a scan performed at the first station device using a low frequency band.

Example 4 may include the device of example 1 and/or some other example herein, wherein the service set element has a size of at least four bytes.

Example 5 may include the device of example 1 and/or some other example herein, wherein the service set element comprises a BSSID list element, a short SSID list element, or a short SSID element.

Example 6 may include the device of example 5 and/or some other example herein, wherein the BSSID list element, the short SSID list element, or the short SSID element, each comprise a variable number of service set elements.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver to cause to send the frame.

Example 9 may include a non-transitory computer-readable medium storing computer-executable instructions which when executed by one or more processors result in performing operations comprising: determining one or more access points (APs) in an enterprise extended service set (ESS); identifying a probe request received from a first station device, wherein the probe request comprises a service set element, wherein the service set element comprises a variable number of service set fields based on a number of APs in the ESS; determining that a service set that matches at least one of the service set fields in the service set element; and causing to send a probe response to the first station device in response to the probe request.

Example 10 may include the non-transitory computer-readable medium of example 9 and/or some other example herein, wherein each of the one or more APs in the enterprise ESS have a same service set identifier (SSID).

Example 11 may include the non-transitory computer-readable medium of example 9 and/or some other example herein, wherein the service set element may be based on a scan performed at the first station device using a low frequency band.

Example 12 may include the non-transitory computer-readable medium of example 9 and/or some other example herein, wherein the service set element has a size of at least four bytes.

Example 13 may include the non-transitory computer-readable medium of example 9 and/or some other example herein, wherein the service set element comprises a BSSID list element, a short SSID list element, or a short SSID element.

Example 14 may include the non-transitory computer-readable medium of example 13 and/or some other example herein, wherein the BSSID list element, the short SSID list element, or the short SSID element, each comprise a variable number of service set elements.

Example 15 may include a method comprising: determining, by one or more processors, one or more access points (APs) in an enterprise extended service set (ESS); identifying a probe request received from a first station device, wherein the probe request comprises a service set element, wherein the service set element comprises a variable number of service set fields based on a number of APs in the ESS; determining that a service set that matches at least one of the service set fields in the service set element; and causing to send a probe response to the first station device in response to the probe request.

Example 16 may include the method of example 15 and/or some other example herein, wherein each of the one or more APs in the enterprise ESS have a same service set identifier (SSID).

Example 17 may include the method of example 15 and/or some other example herein, wherein the service set element may be based on a scan performed at the first station device using a low frequency band.

Example 18 may include the method of example 15 and/or some other example herein, wherein the service set element has a size of at least four bytes.

Example 19 may include the method of example 15 and/or some other example herein, wherein the service set element comprises a BSSID list element, a short SSID list element, or a short SSID element.

Example 20 may include the method of example 19 and/or some other example herein, wherein the BSSID list element, the short SSID list element, or the short SSID element, each comprise a variable number of service set elements.

Example 21 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 22 may include an apparatus comprising logic, modules, and/or circuitry to perform one or more elements of a method described in or related to any of examples 1-20, or any other method or process described herein.

Example 23 may include a method, technique, or process as described in or related to any of examples 1-20, or portions or parts thereof.

Example 24 may include an apparatus comprising: one or more processors and one or more computer readable media comprising instructions that, when executed by the one or more processors, cause the one or more processors to perform the method, techniques, or process as described in or related to any of examples 1-20, or portions thereof.

Example 25 may include a method of communicating in a wireless network as shown and described herein.

Example 26 may include a system for providing wireless communication as shown and described herein.

Example 27 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    participate in a wireless communication with a plurality of co-located access points (APs) to form an enterprise extended service set (ESS), wherein at least one of the plurality of co-located APs comprise an AP with a 6 gigahertz (GHz) operational channels;
    detect on a first wireless communication medium a probe request received from a first station device;
    decode the probe request to identify a service set element comprising a short service set identifier (SSID) element having a size of 4 bytes;
    extract the service set element from the decoded probe request;
    compare the service set element to a list of service set fields that is based on a number of the plurality of co-located APs in the enterprise ESS;
    determine that the service set element matches at least one of the service set fields in the list of service set fields;
    generate a probe response that comprises a reduced neighbor report (RNR) that describes the at least one of the plurality of co-located APs operating at 6 GHz; and
    transmit on the first wireless communication medium the probe response to the first station device in response to the probe request.

2. The device of claim 1, wherein each of the plurality of co-located APs in the enterprise ESS have a same service set identifier (SSID).

3. The device of claim 1, wherein the service set element is based on a scan performed at the first station device using a low frequency band.

4. The device of claim 1, wherein the service set element has a size of at least four bytes.

5. The device of claim 1, wherein the service set element comprises a BSSID list element or a short SSID list element.

6. The device of claim 5, wherein the BSSID list element, the short SSID list element, or the short SSID element, each comprise a variable number of service set elements.

7. The device of claim 1, further comprising a transceiver configured to transmit and receive wireless signals.

8. The device of claim 7, further comprising an antenna coupled to the transceiver to cause to send the probe response.

9. A non-transitory computer-readable medium storing computer-executable instructions which when executed by one or more processors result in performing operations comprising:
    participating in a wireless communication with a plurality of co-located access points (APs) to form an enterprise extended service set (ESS), wherein at least one of the plurality of co-located APs comprise an AP with a 6 gigahertz (GHz) operational channels;
    detecting on a first wireless communication medium a probe request received from a first station device;
    decoding the probe request to identify a service set element comprising a short service set identifier (SSID) element having a size of 4 bytes;
    extracting the service set element from the decoded probe request;
    comparing the service set element to a list of service set fields that is based on a number of the plurality of co-located APs in the enterprise ESS;
    determining that the service set matches at least one of the service set fields in the list of service set fields;
    generating a probe response that comprises a reduced neighbor report (RNR) that describes the at least one of the plurality of co-located APs operating at 6 GHz; and
    transmitting on the first wireless communication medium the probe response to the first station device in response to the probe request.

10. The non-transitory computer-readable medium of claim 9, wherein each of the plurality of co-located APs in the enterprise ESS have a same service set identifier (SSID).

11. The non-transitory computer-readable medium of claim 9, wherein the service set element is based on a scan performed at the first station device using a low frequency band.

12. The non-transitory computer-readable medium of claim 9, wherein the service set element has a size of at least four bytes.

13. The non-transitory computer-readable medium of claim 9, wherein the service set element comprises a BSSID list element or a short SSID list element.

14. The non-transitory computer-readable medium of claim 13, wherein the BSSID list element, the short SSID list element, or the short SSID element, each comprise a variable number of service set elements.

15. A method comprising:
participating in a wireless communication with a plurality of co-located access points (APs) to form an enterprise extended service set (ESS), wherein at least one of the plurality of co-located APs comprise an AP with a 6 gigahertz (GHz) operational channels;
detecting on a first wireless communication medium a probe request received from a first station device;
decoding the probe request to identify a service set element comprising a short service set identifier (SSID) element having a size of 4 bytes;
extracting the service set element from the decoded probe request;
comparing the service set element to a list of service set fields that is based on a number of the plurality of co-located APs in the enterprise ESS;
determining that the service set matches at least one of the service set fields in the list of service set fields;
generating a probe response that comprises a reduced neighbor report (RNR) that describes the at least one of the plurality of co-located APs operating at 6 GHz; and
transmitting on the first wireless communication medium the probe response to the first station device in response to the probe request.

16. The method of claim 15, wherein each of the plurality of co-located APs in the enterprise ESS have a same service set identifier (SSID).

17. The method of claim 15, wherein the service set element is based on a scan performed at the first station device using a low frequency band.

18. The method of claim 15, wherein the service set element has a size of at least four bytes.

19. The method of claim 15, wherein the service set element comprises a BSSID list element or a short SSID list element.

20. The method of claim 19, wherein the BSSID list element, the short SSID list element, or the short SSID element, each comprise a variable number of service set elements.

* * * * *